(12) United States Patent
Casey et al.

(10) Patent No.: US 11,129,251 B2
(45) Date of Patent: Sep. 21, 2021

(54) USER INTERFACE FOR CONTROLLING INTENSITY AND COLOR OF A LIGHTING LOAD

(71) Applicant: Lutron Technology Company LLC, Coopersburg, PA (US)

(72) Inventors: Craig Alan Casey, Coopersburg, PA (US); Thomas M. Shearer, Macungie, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

(21) Appl. No.: 17/082,395

(22) Filed: Oct. 28, 2020

(65) Prior Publication Data

US 2021/0045209 A1  Feb. 11, 2021

Related U.S. Application Data

(63) Continuation of application No. 16/821,896, filed on Mar. 17, 2020, now Pat. No. 10,827,581, which is a continuation of application No. 15/832,532, filed on Dec. 5, 2017, now Pat. No. 10,645,777.

(60) Provisional application No. 62/430,189, filed on Dec. 5, 2016.

(51) Int. Cl.
*H05B 45/20* (2020.01)
*H01H 15/02* (2006.01)
*H01H 23/02* (2006.01)

(52) U.S. Cl.
CPC ............. *H05B 45/20* (2020.01); *H01H 15/02* (2013.01); *H01H 23/02* (2013.01); *Y02B 20/30* (2013.01)

(58) Field of Classification Search
CPC ........ H05B 45/20; H05B 45/10; H05B 47/10; H05B 47/105; H05B 47/175; Y02B 20/30; Y02B 20/40; H01H 15/02; H01H 23/02; H01H 23/12; H01H 19/14
See application file for complete search history.

(56) References Cited

U.S. PATENT DOCUMENTS

| 5,248,919 | A  | 9/1993  | Hanna et al.   |
|-----------|----|---------|----------------|
| 7,791,595 | B2 | 9/2010  | Altonen et al. |
| 8,049,427 | B2 | 11/2011 | Altonen et al. |
| 8,068,814 | B2 | 11/2011 | Celik          |
| 9,392,675 | B2 | 7/2016  | Bhat et al.    |

(Continued)

FOREIGN PATENT DOCUMENTS

EP    2704534 A1    3/2014

*Primary Examiner* — Haissa Philogene
(74) *Attorney, Agent, or Firm* — Michael S. Czarnecki; Glen R. Farbanish; Philip N. Smith

(57) ABSTRACT

A load control device may be configured to provide a user interface for controlling the intensity and/or color of one or more lighting loads. The user interface may include separate actuation members for setting the intensity and/or color of the lighting loads. The user interface may include one actuation member configured to operate in an intensity and/or color control mode. The control mode of the actuation member may be set via a button, a lever, a rotary switch, a rotary knob, etc. The user interface may include a touch sensitive element capable of sensing a user's touch and translate the touch into a control signal. Feedback may be provided on the user interface to indicate the type of control being adjusted and/or amount of control being applied to the lighting loads.

22 Claims, 18 Drawing Sheets

(56) References Cited

U.S. PATENT DOCUMENTS

| | | |
|---|---|---|
| 10,134,268 B2 | 11/2018 | Dimberg et al. |
| 10,485,068 B2 | 11/2019 | Chemel et al. |
| 10,645,769 B2 | 5/2020 | Knauss et al. |
| 10,645,777 B2 | 5/2020 | Casey et al. |
| 10,827,581 B2 * | 11/2020 | Casey ................... H05B 45/20 |
| 2008/0111491 A1 | 5/2008 | Spira et al. |
| 2008/0315798 A1 | 12/2008 | Diederiks et al. |
| 2009/0108765 A1 | 4/2009 | Weightman et al. |
| 2014/0239843 A1 | 8/2014 | Hoang et al. |
| 2014/0300275 A1 | 10/2014 | Altonen et al. |
| 2015/0351191 A1 | 12/2015 | Pope et al. |
| 2017/0278383 A1 * | 9/2017 | Dimberg ................. G01D 5/02 |
| 2018/0338363 A1 | 11/2018 | Clark et al. |
| 2021/0045209 A1 * | 2/2021 | Casey ................... H05B 45/20 |
| 2021/0112647 A1 * | 4/2021 | Coleman ................ F21V 14/02 |

* cited by examiner

USER INTERFACE FOR CONTROLLING INTENSITY AND COLOR OF A LIGHTING LOAD

CROSS-REFERENCE TO RELATED APPLICATIONS

This application is a continuation of U.S. patent application Ser. No. 16/821,896, filed Mar. 17, 2020 (now U.S. Pat. No. 10,827,581), which is a continuation of U.S. patent application Ser. No. 15/832,532, filed Dec. 5, 2017 (now U.S. Pat. No. 10,645,777), which claims the benefit of Provisional U.S. Patent Application No. 62/430,189, filed Dec. 5, 2016, the disclosures of which are incorporated herein by reference in their entireties.

BACKGROUND

The intensity and/or color of a lighting fixture may be manipulated for a variety of purposes such as presentation, comfort, and well-being. Typical color control techniques may include dim-to-warm, correlated color temperature (CCT), and full color tuning. The dim-to-warm control technique allows for adjusting the color temperature of a light source in proportion to the intensity so as to mimic the color shift of incandescent lamps with respect to intensity (e.g., warmer color temperature at lower light levels, cooler color temperature at higher light levels). The correlated color temperature control technique allows for controlling the color temperature and intensity of a light source independently within specified parameters. The full color tuning control technique allows for changing the emitted color spectrum of a light source by mixing several base colors (e.g., red, green, blue) in different proportions.

Different types of intensity control/color tuning techniques may require different types of user interfaces. The dim-to-warm control technique, for example, generally requires one control input. The input may be translated (e.g., by an LED driver) into an appropriate intensity and/or color control signal for driving the lighting fixture. The correlated color temperature control technique and/or the full color tuning control technique may require one control input for color temperature and a separate control input for light intensity. A user interface may also need to be capable of activating and/or deactivating preconfigured environmental settings (e.g., a lighting scene created by tuning one or more lighting fixtures to particular color and/or intensity values). Further, a user may desire to not only apply the aforementioned types of control, but also receive feedback about the type, amount and/or result of the control being applied.

SUMMARY

As described herein, a load control device may be provided that includes a user interface for controlling the intensity and color of one or more lighting loads. The load control device may be a wall-mounted electrical device having a limited area for presenting the user interface to a user (e.g., through an opening of a faceplate). The user interface may be designed with a focus on the ease of use of the controls. The user interface may present one or more actuators for controlling the intensity and color of the lighting loads in a manner that is compact, but easy to understand. Functions that are in greater demand may be made more prominent on the user interface and/or easier to actuate by the user. For example, priority in terms of size, placement, durability, and/or smartness of an actuation mechanism may be given to switch actions (e.g., on/off), followed by intensity control and color turning. In some examples, the actuators for controlling intensity may be emphasized over the actuators for controlling color.

In one example, the user interface may include separate actuation members for adjusting the intensity or color of the lighting loads. The user interface may comprise a first elongated actuator configured to receive a first user input for controlling the intensity of the lighting load, and a second elongated actuator configured to receive a second user input for controlling the color of the lighting load. The first elongated actuator may be provided on a bezel of the control device, and may be vertically arranged along the bezel. The second elongated actuator may also be provided on the bezel and horizontally arranged along the bezel. The user interface may further comprise a rectangular toggle actuator, where the vertically-arranged actuator is located along a side of toggle actuator, and the horizontally-arranged actuator is located along a bottom of the toggle actuator. The vertically-arranged actuator may have a length that is shorter than a length of the toggle actuator, and the horizontally-arranged actuator may have a length that is shorter than a width of the toggle actuator and shorter than the length of vertically-arranged actuator. Such a design focus may result in, for example, a user interface comprising a "big switch" for toggling the lighting load on and off, a "little dimmer" for adjusting the intensity of the lighting load, and a "tiny color control" for adjusting the color of the lighting load.

In another example, the vertically-arranged and horizontally-arranged actuators may each comprise a slider knob provided in a slider slot. For example, the slider slot of the horizontally-arranged actuator may be located below the slider slot of the vertically-arranged actuator, or the slider slot of the horizontally-arranged actuator may be located on the slider knob of the vertically-arranged actuator.

In another example, the user interface may include a common actuator for adjusting both intensity and color of the lighting load. The user interface may be configured to operate in either an intensity or a color control mode. The control mode of the common actuator may be set before the actuator is used to set the intensity or color of the lighting loads. The control mode of the actuator may be set via a button, a lever, a rotary switch, a rotary knob, and/or the like.

The user interface may include a touch sensitive element (e.g., a touch sensitive actuator or a capacitive touch panel) capable of sensing a user's touch and translate the touch into a signal for driving the lighting loads. Feedback may be provided on the user interface to indicate the type of control being adjusted and/or amount of control being applied to the lighting loads. The feedback may be provided via one or more indicator lights or a light bar, for example. The user interface may be further configured to activate preconfigured settings of the light loads.

DETAILED DESCRIPTION

Figure 1A:
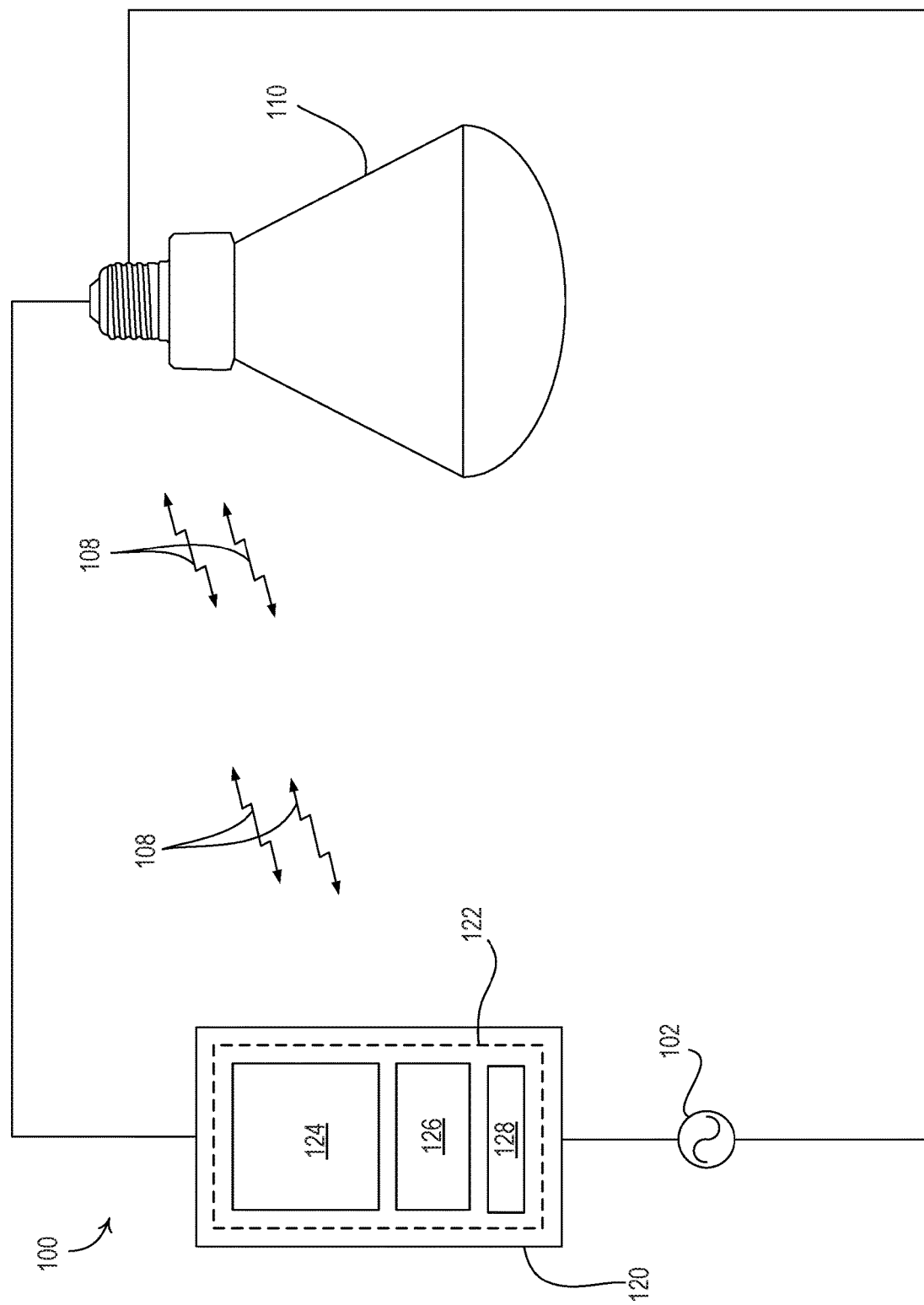
FIG. 1A shows block diagram of an example load control system that includes a load control device for controlling the intensity and/or color of a lighting load.

FIG. 1A depicts an example load control system 100. As shown, the load control system 100 may be configured as a lighting control system comprising a lighting load, such as a controllable light source 110, and a load control device 120. The load control device 120 may be adapted to be wall-mounted in a standard electrical wallbox. The load control device 120 may be coupled (e.g., via a series electrical connection) between an alternating-current (AC) power source 102 and the controllable light source 110. The controllable light source 110 may include an internal lighting load (e.g., a light-emitting diode (LED) light engine) and an internal load regulation circuit (e.g., an LED driver). In addition, the load control device 120 may not be wall-mounted, but may be a plug-in load control device configured to be coupled between an electrical receptacle and a plug-in electrical load.

The load control device 120 may include a user interface 122 that may comprise one or more actuators for controlling an intensity and a color (e.g., a color temperature) of the controllable light source 110. For example, the user interface 122 may comprise a toggle actuator 124 configured to be actuated for toggling, e.g., turning off and on, the controllable light source 110, and an intensity adjustment actuator 126 configured to be actuated for changing a lighting intensity of the controllable light source 110, and/or a color adjustment actuator 128 configured to be actuated for changing a color of the controllable light source 110. In one example, the toggle actuator 124 may be larger than the intensity adjustment actuator 126, which may be larger than the color adjustment actuator 128 in order to emphasize adjustment of the intensity of the controllable light source 110 over adjustment of the color of the light source. In another embodiment, a common actuator may function as the intensity adjustment actuator 126 and the color adjustment actuator 128. The load control device 120 may adjust the intensity of the controllable light source 110 in response to the common actuator when operating in an intensity adjustment mode, and may adjust the color of the controllable light source 110 in response to the common actuator when operating in a color adjustment mode.

The user interface 122 of the load control device 120 may also comprise a visual display (not shown) that may be illuminated, e.g., by a plurality of light-emitting diodes (LEDs). The visual display may be arranged as an array of indicator lights or as a light bar, to provide feedback about the operational state of the light source 110 (e.g., to indicate intensity or color of the light source). An example of a load control device including a visual display is described in greater detail in U.S. Pat. No. 5,248,919, issued Sep. 28, 1993, entitled LIGHTING CONTROL DEVICE, the entire disclosure of which is hereby incorporated by reference.

The load control device 120 may be configured to generate one or more control signals that may be received by the controllable light source 110 for turning the controllable light source on and off, and/or for the adjusting the intensity and/or color of the controllable light source. For example, the load control device 120 may be configured to transmit wireless signals, for example radio frequency (RF) signals 108, to the controllable light source 110. The wireless signals may be used to control the intensity and/or color of the controllable light source 110. The controllable light source 110 may be associated with the load control device 120 (e.g., during a configuration procedure of the load control system 100) such that the controllable light source 110 may be responsive to the RF signals 108 transmitted by the load control device 120. An example of a configuration procedure for associating a load control device with an electrical load is described in greater detail in commonly-assigned U.S. Patent Publication No. 2008/0111491, published May 15, 2008, entitled "Radio-Frequency Lighting Control System," the entire disclosure of which is hereby incorporated by reference. In another example, the load control device 120 may be implemented as a free-standing remote control device (e.g., such as a table-top load control device or a hand-held load control device) or a mountable remoted control device (e.g., such as a remote control device capable of being mounted on an existing switch).

It should be appreciated that while a wireless communication scheme is shown as being used in FIG. 1A, the load control device 120 may communicate with the light source 110 using either or both of wired and wireless communication techniques. For example, the load control device 120 may be coupled to the controllable light source 110 via one or more analog control links (e.g., two 0-10V control links) for controlling the intensity and/or color of the controllable light source. In addition, the load control device 120 may be configured to generate a phase-control signal for controlling the intensity of the controllable light source 110 and may transmit wireless signals for controlling the color of the controllable light source. While the controllable light source 110 is shown in FIG. 1 as a screw-in lamp, the controllable light source may also be implemented as a lighting fixture that includes one or more LED light engines and one or more LED drivers.

Figure 1B:
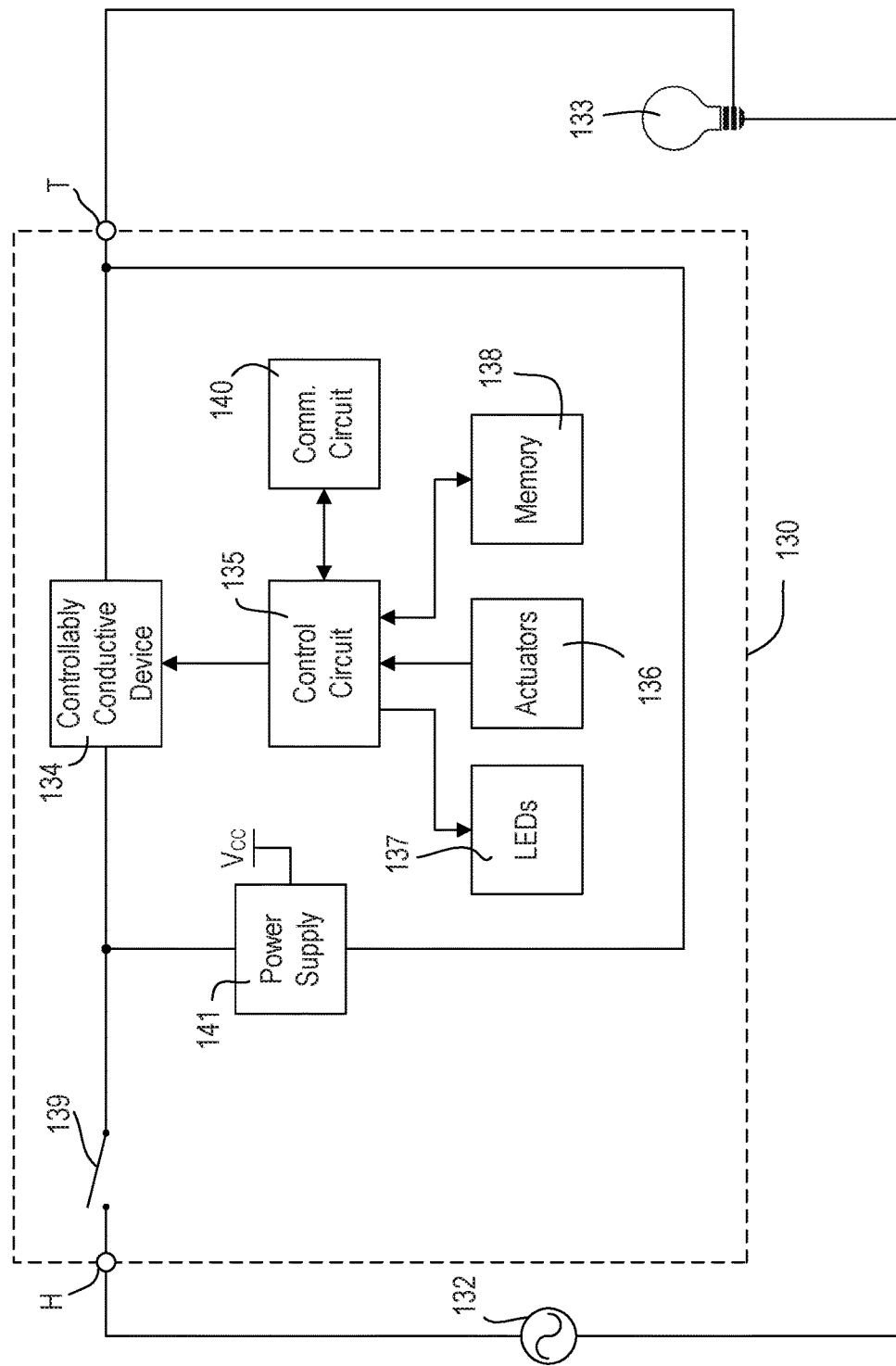
FIG. 1B shows a simplified block diagram of an example control device that may be deployed in the load control device depicted in FIG. 1A.

FIG. 1B is a simplified block diagram of an example control device 130 for a load control device (e.g., the load control device 120 shown in FIG. 1A). The control device 130 may include a hot terminal H that may be adapted to be coupled to an AC power source 132. The control device 130 may further include an output terminal T that may be adapted to be coupled to an electrical load, such as a lighting load 133 (e.g., the controllable light source 110 shown in FIG. 1). The control device 130 may include a controllably conductive device 134 coupled in series electrical connection between the AC power source 132 and the lighting load 133. The control device 130 may include a control circuit 135 configured to control the controllably conductive device 134 to render the controllably conductive device 134 conductive or non-conductive to control the power delivered to the lighting load 133.

An air-gap switch 139 may be coupled in series with the controllably conductive device 134. The air-gap switch 139 may be opened and closed in response to actuations of an air-gap actuator. When the air-gap switch 139 is closed, the controllably conductive device 134 is operable to conduct current to the load. When the air-gap switch 139 is open, the lighting load 133 is disconnected from the AC power source 132. The controllably conductive device 134 may operate as a relay to turn the lighting load on and off, e.g., when the control device 130 is not configured to perform phase control over the lighting load 133. The controllable conductive device 134 may be omitted from the control device 130, in which case the load control device may be implemented as a free-standing remote control device (e.g., powered by AC or DC voltage), as described herein.

The control device 130 may comprise a user interface including one or more actuators 136 and one or more visual indicators, which may be illuminated by light-emitting diodes (LEDs) 137. The control circuit 135 may receive inputs from the actuators 136 and translate the inputs into control signals (e.g., intensity and/or color control signals) for transmission to the lighting load 133. The control circuit 135 may control the LEDs 137 to illuminate the visual indicators to provide feedback to the user about the operational status of the lighting load 133 (e.g., the intensity and/or color of the light sources).

The control device 130 may include a communication circuit 140 coupled to the control circuit 135 for transmitting and/or receiving digital messages between the control device 130 and the lighting load 133. The communication circuit 140 may be configured to transmit the control signals generated by the control circuit 135 (e.g., intensity and/or color control signals) to the lighting load 133 using a wireless communication scheme (e.g., via radio frequency signals). Alternatively or in addition to the wireless communication scheme, the communication circuit may be configured to transmit the control signals using wired communication techniques. For example, the control circuit 135 may utilize multi-wire digital communication links such as digital addressable lighting interface (DALI), Ecosystem links, or other proprietary communication links for transmitting the control signals to the lighting load 133. As another example, the control circuit 135 may utilize the power line to transmit the control signals. Techniques for providing communication via existing power wiring are described in greater detail in commonly-assigned U.S. Pat. No. 9,392,675, issued Jul. 12, 2016, entitled "Digital Load Control System Providing Power and Communication via Existing Power Wiring," and U.S. Pat. No. 8,068,814, issued Nov. 29, 2011, entitled "System for Control of Lights and Motors," the entire disclosures of which are hereby incorporated by reference.

Alternatively or additionally, the control circuit 135 may be configured to transmit the control signals via one or more wired analog control links (e.g., phase-control signals or 0-10V control signals). For example, the control circuit 135 may generate two phase-control signals or two 0-10V control signals to respectively control the intensity and color of the lighting load 133. As another example, the control circuit 135 may utilize phase-control to control the intensity of the lighting load 133, and RF communication to control the color of the lighting load 133.

The control device 130 may include a memory 138 coupled to the control circuit 135. The memory 138 may be used to store the operational parameters of the control device 130 and/or the lighting load 133 (e.g., such as the intensity/color of the lighting load 133 before it is turned off, preconfigured lighting scenes and their associated intensity/color, etc.). The memory 138 may be implemented as an external integrated circuit (IC) or as an internal circuit of the control circuit 135. The load control device 130 may include a power supply 141. The power supply 141 may generate a direct-current (DC) supply voltage $V_{CC}$ for powering the control circuit 135 and the other low-voltage circuitry of the control device 130. The power supply 141 may be coupled in parallel with the controllably conductive device 134. The power supply 141 may be operable to conduct a charging current through the lighting load 133 to generate the DC supply voltage $V_{CC}$.

Although a single lamp is shown in FIGS. 1A and 1B, the lighting load 133 may include one or more light sources (e.g., LED light sources), and one or more LED drivers or control devices. The lighting load 133 may include an enclosure configured to house one or more electrical components of the lighting load (e.g., such as one or more load regulation circuits). The one or more electrical components may be operable to control the intensity of the lighting load 133 between a low-end intensity (e.g., approximately 1%) and a high-end intensity (e.g., approximately 100%). The one or more electrical components may be operable to control the color of the light emitted by the lighting load 133. For example, when the lighting load 133 comprises one or more LED light sources, the one or more electrical components may be operable to control the colors of the LED light sources in a color temperature control mode or a full-color control mode. The lighting load 133 may include a communication circuit (e.g., a wireless communication circuit) configured to receive the control signals transmitted from the control device 130, and to control the intensity and/or color of the lighting load in response to receiving the control signals.

Figure 2:
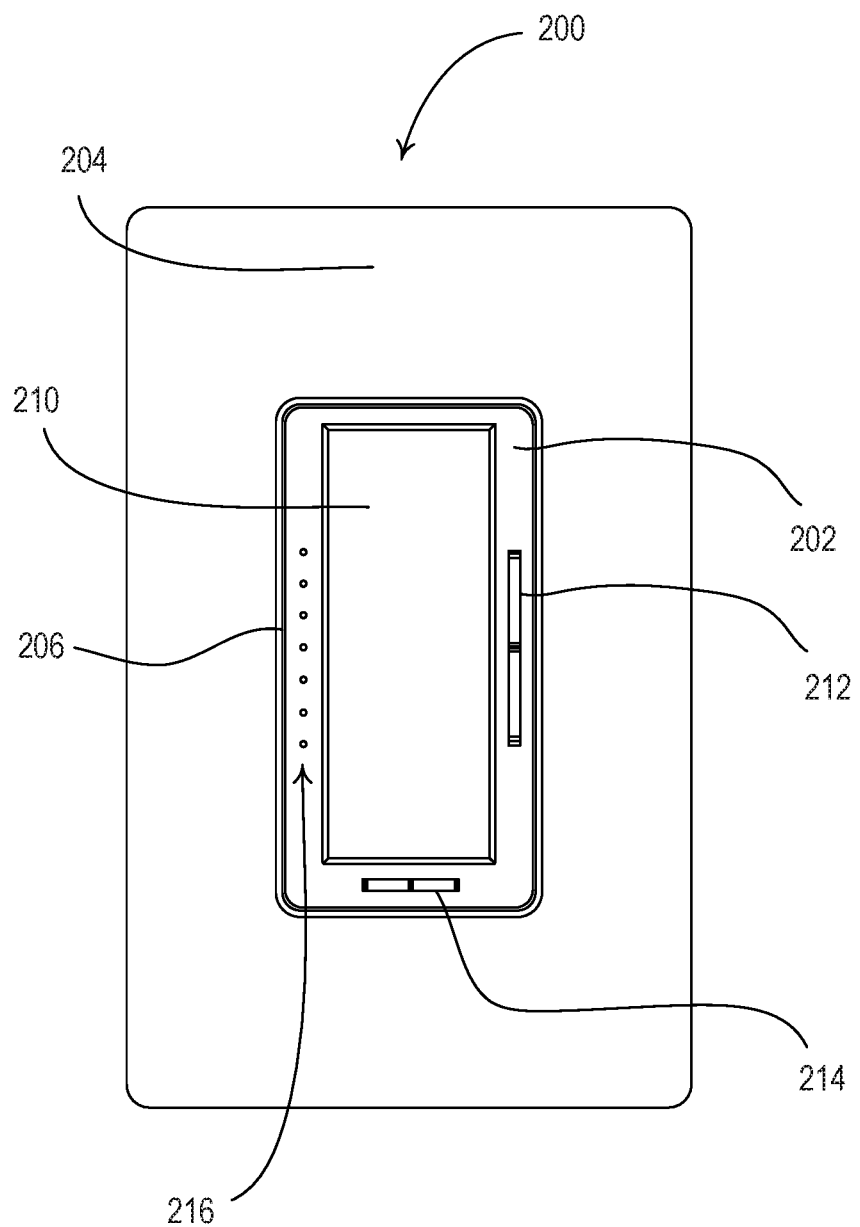
FIG. 2 shows a front view of an example user interface comprising a plurality of actuators for adjusting the intensity and color of a lighting load, and a visual display for indicating the intensity and/or color the lighting load.

FIG. 2 shows a front view of an example user interface 200 that may be provided on a load control device described herein (e.g., the load control device 120). The user interface 200 may include a rectangular toggle actuator 210, an elongated vertically-arranged actuator, such as an intensity adjustment actuator 212, and/or an elongated horizontally-arranged actuator, such as a color adjustment actuator 214. The toggle actuator 210, the intensity adjustment actuator 212, and the color adjustment actuator 214 may be provided on a bezel 202. The bezel 202 may extend through an opening 206 in a faceplate 204 that covers the wallbox in which one or more components of the load control device may be mounted. The intensity adjustment actuator 212 may extend vertically along a vertical axis of the bezel 202 and/or the faceplate 204 when the load control device is installed.

The color adjustment actuator 214 may extend horizontally along a horizontal axis of the bezel 202 and/or the faceplate 204 when the load control device is installed. Actuation of the toggle actuator 210 may toggle, e.g., turn off and on, a light source (e.g., the light source 110) connected to the load control device. Actuations of the intensity adjustment actuator 212 and color adjustment actuator 214 may respectively adjust the light intensity or color (e.g., color temperature) of the light source. For example, the intensity adjustment actuator 212 may be used to adjust an intensity level, for example, between a minimum intensity level (e.g., approximately 1%) and a maximum intensity level (e.g., approximately 100%) for the light source. The color adjustment actuator 214 may be used to adjust a color (e.g., a color temperature) of the light source, for example, between a first color temperature (e.g., a warm-white color temperature, such as 2000 Kelvin) and a second color temperature (e.g., a cool-white color temperature, such as 10,000 Kelvin). Actuations of an upper portion and a lower portion of the intensity adjustment actuator 212 may raise and lower the light intensity of the light source, respectively. Actuations of a right portion and a left portion of the color adjustment actuator 214 may adjust the color temperature of the light source towards the first and second color temperatures, respectively.

The toggle actuator 210, the intensity adjustment actuator 212, and the color adjustment actuator 214 may be configured to enhance the usability of the user interface 200. Actuators that are in greater demand (e.g., which are used more often and/or require quick/easy access) may be made more prominent on the user interface and/or easier to actuate by the user. For example, priority in terms of size, placement, durability, and/or smartness of an actuation mechanism may be given to the toggle actuator 210 (e.g., for switching the light source on/off), followed by the intensity adjustment actuator 212, and then the color adjustment actuator 214. As shown in FIG. 2, for example, the toggle actuator 210 may have a rectangular shape, which may be the biggest size among the controls, and may be placed in the center of the user interface 200. The intensity adjustment actuator 212 may be smaller in size than the toggle actuator 210 (e.g., having a smaller area than the toggle actuator 210 and having a length that is shorter than a length of the toggle actuator 210). The intensity adjustment actuator 212 may occupy a less prominent area of the user interface than the toggle actuator 210 (e.g., along one side of the toggle actuator 210). The color adjustment actuator 214 may have the smallest size (e.g., having a smaller area than the toggle actuator 210 and having a length that is shorter than a width of the toggle actuator 210). The color adjustment actuator 214 may have a shorter length than the length of the intensity adjustment actuator 212. The color adjustment actuator 214 may occupy another less prominent area of the user interface than the toggle actuator 210 and the intensity adjustment actuator 212 (e.g., along the bottom of the toggle actuator 210).

As described herein, the intensity adjustment actuator 212 and the color adjustment actuator 214 may be provided apart and/or oriented differently from each other (e.g., to avoid misuse of the actuators). For example, the intensity adjustment actuator 212 may be arranged along a vertical axis of the bezel 202 (e.g., on the right side of the toggle actuator 210), while the color adjustment actuator 206 may be arranged along a horizontal axis of the bezel 202 (e.g., below the toggle actuator 210). Indicia (e.g., text and/or icons) may be affixed (e.g., engraved in the surface of the bezel 202) next to the actuators to indicate the functional purposes of the actuators.

Either or both of the intensity adjustment actuator 212 and color adjustment actuator 214 may each include a rocker switch provided on the bezel (e.g., as shown in FIG. 2). Actuations of upper and lower portions of the rocker switch of the intensity adjustment actuator 212 may cause the intensity of the light source to be raised and lowered, respectively, within an intensity range (e.g., from approximately 1% to approximately 100%). Actuations of side portions of the color adjustment actuator 214 may cause the color of the light source to be adjusted within a color range (e.g., between two color temperatures or across the entire color spectrum).

In addition, either or both of the intensity adjustment actuator 212 and color adjustment actuator 214 may include a sliding mechanism (e.g., a linear slider) provided on the bezel 202. Manipulating the sliding mechanism of the intensity adjustment actuator 212 or the color adjustment actuator 214 may respectively change the intensity or color of the light source within an intensity range (e.g., from approximately 1% to approximately 100%) or a color range (e.g., the entire color spectrum).

Further, either or both of the intensity adjustment actuator 212 and/or the color adjustment actuator 214 may include a touch sensitive actuator (e.g., including a resistive or capacitive touch element) that may be responsive to a user's touch and capable of translating the touch into a control signal for setting the intensity and/or color of the light source. The touch sensitive actuator may include a plurality of force concentrators for actuating a resistive touch element. When a user applies a force on the resistive touch element (e.g., by pressing a finger against or moving a finger along the touch sensitive actuator), the force from the touch may be sensed and transmitted (e.g., by an input circuit such as the input circuit 135) to a control circuit (e.g., such as the control circuit 135) of the load control device. The control circuit may translate the input signal into an intensity or color control signal, which may be used to drive the connected light source within an intensity range (e.g., from approximately 1% to approximately 100%) or a color range (e.g., the entire color spectrum). An example of a load control device comprising a thin touch sensitive actuator is described in greater detail in commonly-assigned U.S. Pat. No. 7,791,595, issued Sep. 7, 2010, entitled TOUCH SCREEN ASSEMBLY FOR A LIGHTING CONTROL, the entire disclosure of which is hereby incorporated by reference.

The example user interface 200 may include a visual display (e.g., a linear array of visual indicators 216 as shown in FIG. 2). The visual indicators 216 may operate as a feedback mechanism through which a user may learn about of an operational state of the connected light source, such as the on/off state, the intensity, and/or the color (e.g., the color temperature) of the light source. The visual indicators 216 may be illuminated by one or more light-emitting diodes (LEDs) arranged in a linear array and mounted behind the bezel 202, for example. The visual indicators 216 may be illuminated when the light of the LEDs is emitted through a series of small openings in the bezel 202. The number of LEDs that are illuminated may increase or decrease in accordance with the present intensity level of the light source (e.g., more illuminated LEDs may indicate higher light intensity). The color of the LEDs may be changed to reflect the color of the light source. As such, a user may be informed about the type of control presently being adjusted (e.g., intensity control or color control) and/or the amount of control (e.g., intensity or color) presently being applied to the light source.

The visual display may comprise a light bar (not shown). A portion or the entirety of the light bar may be illuminated (e.g., by one or more LEDs), and the length of the illuminated portion may provide an indication of the current intensity level of the light source. In some examples, when the toggle actuator 210 is actuated to turn the light source on, the light bar may be illuminated to quickly increase the length of the illuminated portion of the light bar to correspond to a previously selected intensity of the light source (e.g., the intensity of the light source before it was turned off, which may be stored in memory). When the toggle actuator 210 is actuated to turn the light source off, the length of the illuminated portion of the light bar may be decreased quickly to reflect the fact that the light source is being turned off. Instead of or in addition to changing the length of the illuminated portion of the light bar, the intensity of the light bar may be varied (e.g., as a function of the intensity of the light source) to reflect the intensity of the light source. The color of the illuminated portion may also be varied, e.g., to show the color of the light source. In some cases, the light bar may be provided on the intensity actuator and/or the color actuator. One or more aspects of the aforementioned feedback mechanism may be applied to all of the example user interfaces described herein.

Figure 3:
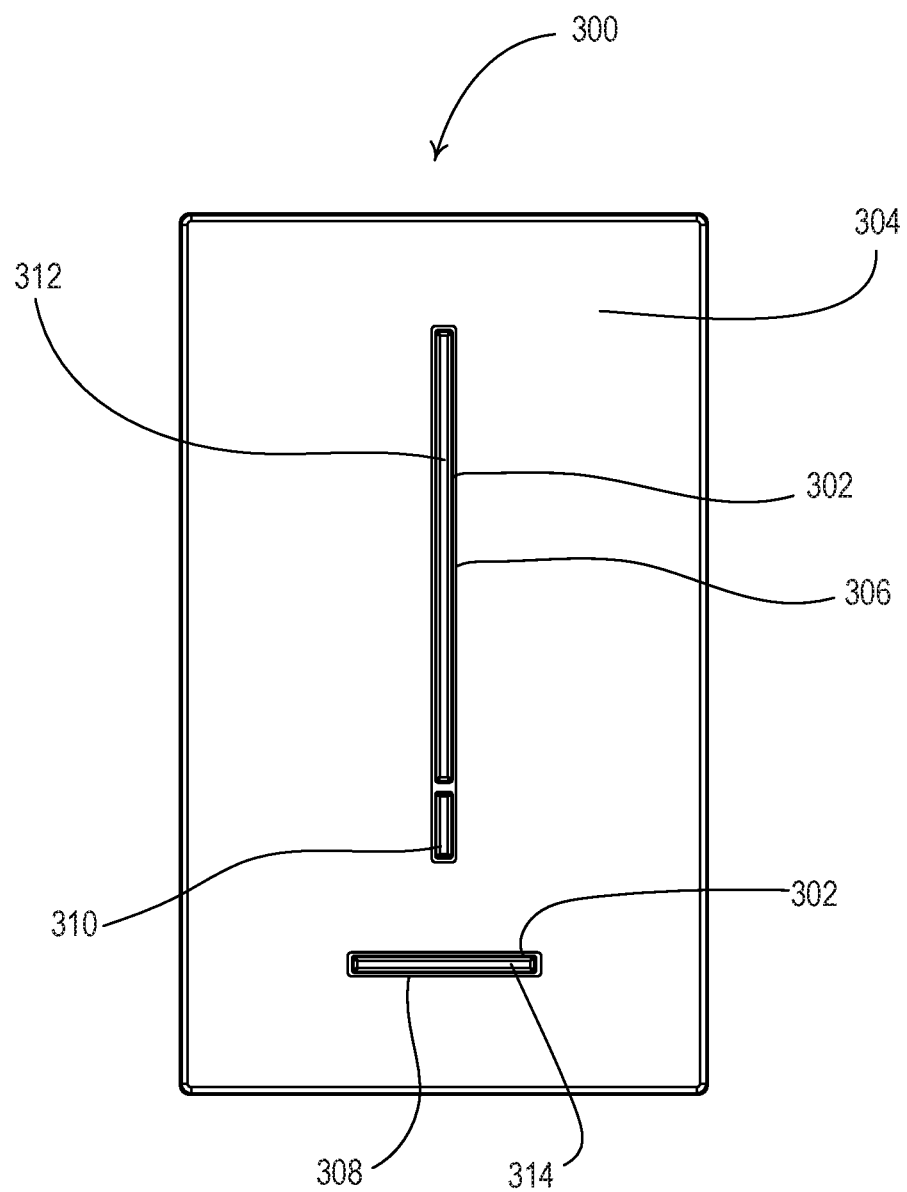
FIG. 3 shows a front view of an example user interface comprising two touch-sensitive actuators for controlling the intensity and color of a lighting load.

FIG. 3 shows a front view of an example user interface 300 comprising a toggle actuator 310, an elongated vertically-arranged actuator, such as an intensity adjustment actuator 312, and/or an elongated horizontally-arranged actuator, such as a color adjustment actuator 314. Any or all of the actuators 310, 312, 314 may be a touch sensitive actuator (e.g., including a resistive or capacitive touch element described herein). The intensity adjustment actuator 312 and the color adjustment actuator 314 may be provided on portions of a bezel 302 that may extend through respective openings 306, 308 in a faceplate 304. The intensity adjustment actuator 312 may be longer than the color adjustment actuator 314, and may occupy a more prominent location of the faceplate 304 than the color adjustment actuator 314, for example to make the intensity control function of the user interface 300 more conspicuous and/or easier to access. For example, the intensity adjustment actuator 312 may be aligned with the first opening 306, which may be elongated and arranged vertically (e.g., along a vertical axis of the faceplate 308) in the center of the faceplate 304, while the color adjustment actuator 314 may be aligned with the second opening, which may be elongated (but shorter) and arranged horizontally (e.g., along a horizontal axis of the faceplate 308) towards the bottom of the faceplate 304.

The intensity adjustment actuator 312 and color adjustment actuator 314 may be actuated to adjust the intensity or color (e.g., color temperature) of a connected light source, as described herein. The toggle actuator 310 may serve a number of purposes. For example, pressing the toggle actuator 310 may turn off the light source, or turn on the light source to a previously set intensity level (e.g., the intensity level of the light source before it was turned off). Visual feedback (e.g., such as the light bar described herein) may be provided (e.g., on the intensity adjustment actuator 312 and/or the color adjustment actuator 314) to indicate the intensity and/or color of the light source. The toggle actuator 310 may be illuminated (e.g., to different intensity and/or colors to indicate whether the light source is on or off.

Figure 4A:
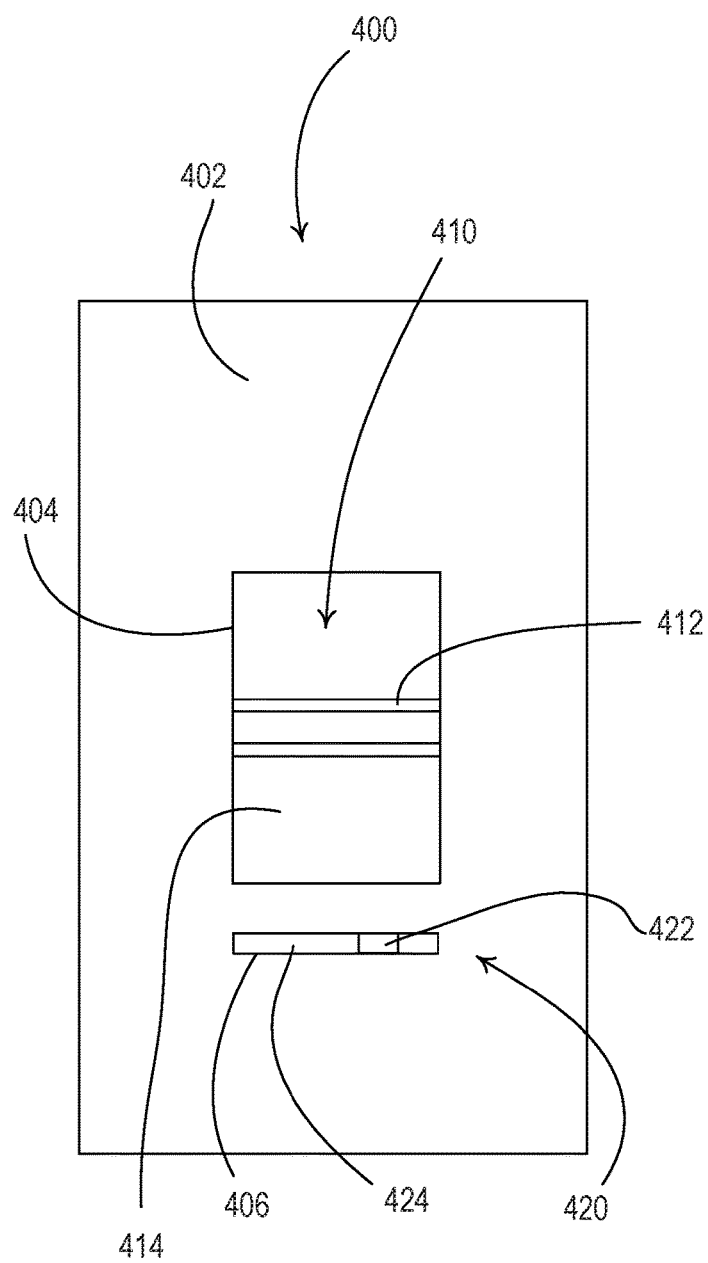
FIG. 4A is a front view and FIG. 4B is a right side view of an example user interface comprising an intensity adjustment actuator and a color adjustment actuator located below the intensity adjustment actuator.
Figure 4B:
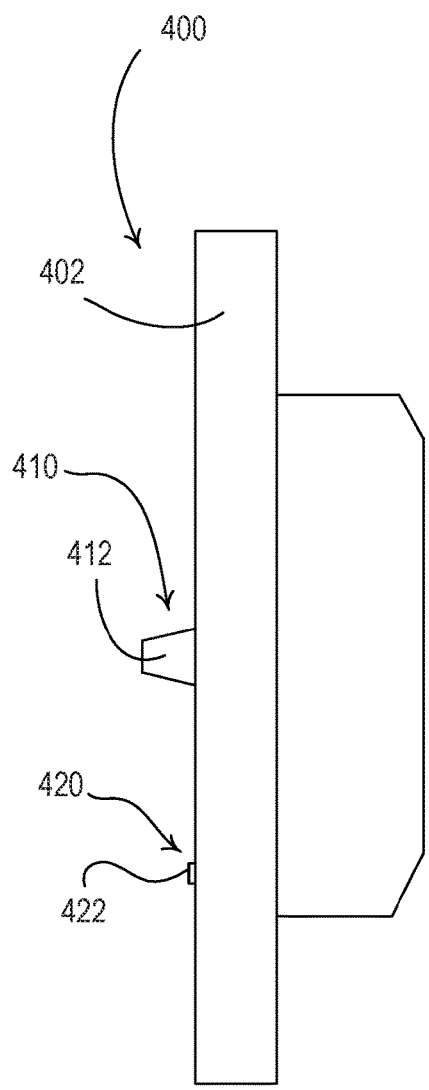

FIG. 4A is a front view and FIG. 4B is a right side view of an example user interface 400 comprising an elongated vertically-arranged actuator, such as an intensity adjustment slider 410 and an elongated horizontally-arranged actuator, such as a color adjustment slider 420. The intensity adjustment slider 410 may comprise an intensity slider knob 412 provided in an intensity slider slot 414, while the color adjustment slider 420 may comprise a color slider knob 422 provided in a color slider slot 424. The intensity slider knob 412 may be configured to slide along the intensity slider slot 414 in, for example, a vertical direction, and the color slider knob 422 may be configured to slide along the color slider slot 424 in, for example, a horizontal direction. The intensity slider slot 414 and the color slider slot 424 may be aligned with respective openings 404, 406 in a faceplate 402. In addition, the intensity slider slot 414 and the color slider slot 424 may be located adjacent (e.g., immediately adjacent) to each other within a single opening of a faceplate. The dimensions of the intensity adjustment slider 410 (e.g., the intensity slider knob 412 and the intensity slider slot 414) may be bigger than those of the color adjustment slider 420 (e.g., the color slider knob 422 and color adjustment slider slot 424) in order to make the intensity control function of the user interface 400 more conspicuous and/or easier to access than the color control function, for example. The intensity adjustment slider 410 (e.g., the intensity slider slot 424) may occupy a more prominent position on the faceplate 402 (e.g., the center of the faceplate) than the color adjustment slider 420 (e.g., the color slider slot 424), which may be located below the intensity slider slot 424.

The intensity slider knob 412 and color slider knob 422 may slide along the intensity slider slot 414 and color slider slot 424, to set the intensity or color (e.g., color temperature) of a connected light source, respectively. For example, the intensity of the light source may be raised in response to upward movements of the intensity slider knob 412 and lowered in response to downward movements of the intensity slider knob 412. Sliding the intensity adjustment slider 402 all the way to one end of the intensity slider slot 406 (e.g., to the bottom of the intensity slider slot) may turn off the connected light source. In addition, the color temperature of the light source may be adjusted towards a first color temperature (e.g., a red-white color temperature) in response to movements of the color slider knob 422 in a first horizontal direction (e.g., to the left) and towards a second color temperature (e.g., a blue-white color temperature) in response to movements of the color slider knob 422 in a second horizontal direction (e.g., to the right).

The position of the intensity slider knob 412 in the intensity slider slot 414 may provide a visual indication of the intensity of the light source. The position of the color slider knob 422 in the color slider slot 424 may provide a visual indication of the color (e.g., color temperature) of the light source. In addition, visual feedback may be provided by illuminating one or more visual indicators (e.g., such as the visual indicators 216) to indicate the intensity and/or color of the light source.

Figure 5A:
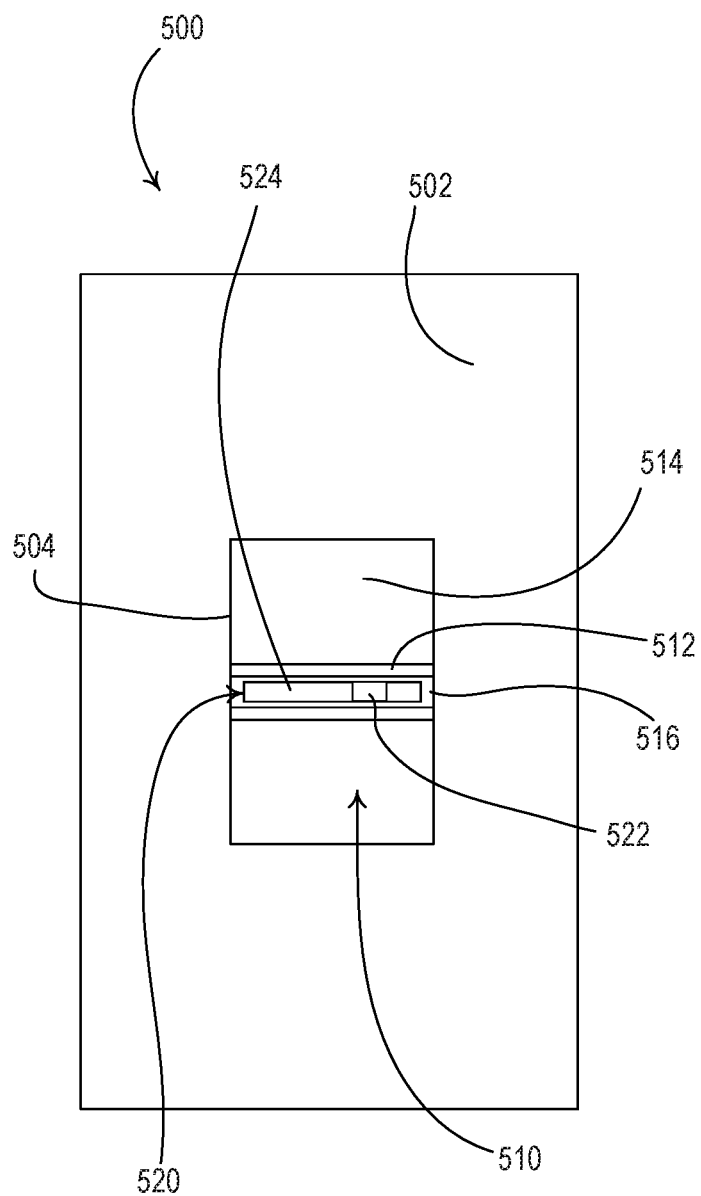
FIG. 5A is a front view and FIG. 5B is a right side view of an example user interface comprising an intensity adjustment actuator and a color adjustment actuator provided on the intensity adjustment actuator.
Figure 5B:
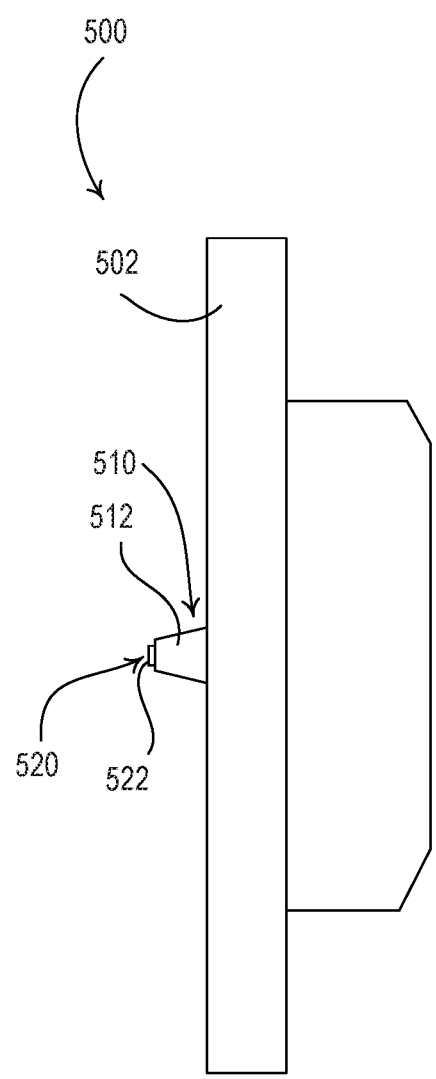

FIG. 5A is a front view and FIG. 5B is a right side view of an example user interface 500 comprising an elongated vertically-arranged actuator, such as an intensity adjustment slider 510, and an elongated horizontally-arranged actuator, such as a color adjustment slider 520, that is provided on the intensity adjustment slider 510. The intensity adjustment slider 510 may comprise an intensity slider knob 512 that may be confined inside an intensity slider slot 514 (e.g., which may be aligned with an opening 504 in a faceplate 502), and may slide along the intensity slider slot 514, for example in a vertical direction. The color adjustment slider 520 may comprise a color slider knob 522 that may be confined inside a color slider slot 524, both of which may be provided on a front surface 516 of the intensity slider knob 512 of the intensity adjustment slider 510 (e.g., the color adjustment slider 520 may be located within the boundaries of the intensity adjustment slider 510). The color slider knob 522 may slide along the color slider slot 524, for example in a direction orthogonal to the direction of movement of the intensity slider knob 512 (e.g., in a horizontal direction). As such, the intensity slider knob 512 of the intensity adjustment slider 510 may be more conspicuous and/or easier to access than the color slider knob 522 of the color adjustment slider 520. In place of or in addition to a slider, the elongated horizontally-arranged actuator may comprise a lever that may pivot about an axis to allow the level to move in the horizontal direction to allow for adjustment of the color (e.g., the color temperature) of the light source.

As the user slides the intensity slider knob 512 or the color slider knob 522 along the intensity slider slot 514 or the color slider slot 524, respectively, the intensity or color (e.g., color temperature) of a connected light source may be adjusted accordingly. For example, the intensity of the light source may be raised in response to upward movements of the intensity slider knob 512 and lowered in response to downward movements of the intensity slider knob 512. The user may slide the intensity slider knob 512 all the way to one end of the intensity slider slot 514 (e.g., to the bottom of the intensity slider slot) to turn off the connected light source. In addition, the color temperature of the light source may be adjusted towards a first color temperature (e.g., a red-white color temperature) in response to movements of the color slider knob 522 in a first horizontal direction (e.g., to the left) and towards a second color temperature (e.g., a blue-white color temperature) in response to movements of the color slider knob 522 in a second horizontal direction (e.g., to the right).

The position of the intensity slider knob 512 in the intensity slider slot 514 may provide a visual indication of the intensity of the light source. The position of the color slider knob 522 in the color slider slot 524 may provide a visual indication of the color (e.g., color temperature) of the light source. In addition, visual feedback may be provided by illuminating one or more visual indicators (e.g., such as the visual indicators 210) to indicate the intensity and/or color of the light source.

Figure 6B:
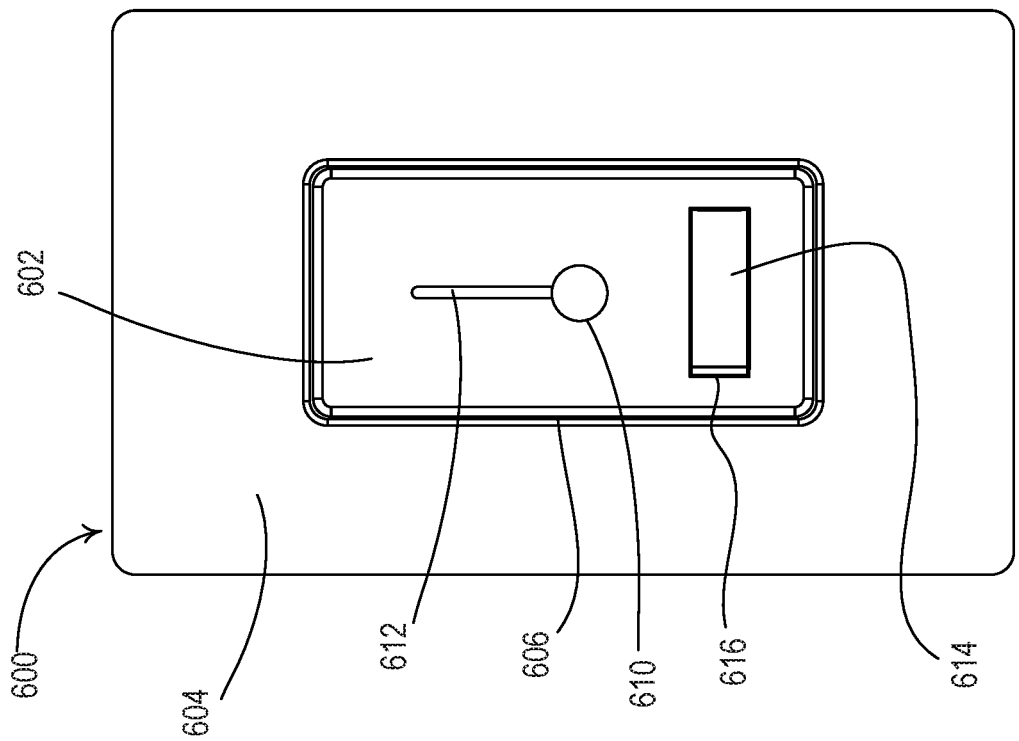
FIG. 6A is a perspective view and FIG. 6B is a front view of an example user interface comprising a rotating slider knob for adjusting the intensity and color of a lighting load.
Figure 6A:
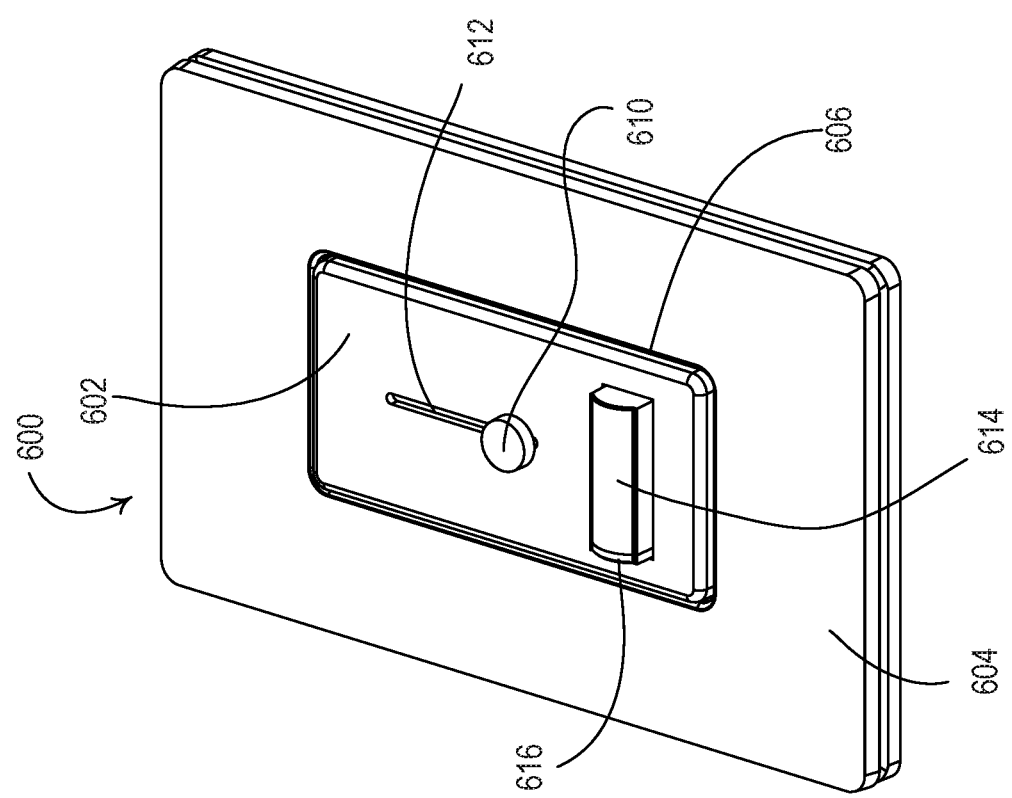

FIG. 6A is a perspective view and FIG. 6B is a front view of an example user interface 600 comprising a slider knob 610 (e.g., a rotating slider knob) for controlling the intensity and/or color (e.g., color temperature) of a light source. The slider knob 610 may be provided on a bezel 602 that may extend through an opening 606 in a faceplate 604. The slider knob 610 may slide along a slider slot 612. The slider knob 610 may be connected to an internal potentiometer (not shown) via a shaft (not shown) that may extend through the slider slot 612 (e.g., rotate with respect to the bezel 602). The slider knob 610 may be configured to rotate about the shaft that extends through the slider slot 612. The light source may be turned on and off using a toggle button 614. Alternatively or additionally, pushing the slider knob 610 towards the bezel 602 may turn the connected light source on or off. Alternatively or additionally, the light source may be turned off after its intensity is decreased to a minimum intensity (e.g., in response to moving the slider knob 610 all the way down the slider slot 612).

While the light source is on, a user may slide the slider knob 610 along the slider slot 612 to adjust the intensity of the light source and may rotate the slider knob 610 to adjust the color of the light source. Alternatively or additionally, the user may rotate the slider knob 610 to adjust the intensity of the light source and may slide the slider knob 610 along the slider slot 612 to adjust the color of the light source. The slider knob 610 may freely-rotate around the shaft to allow the user to continuously adjust the intensity and/or color of the light source by rotating the slider knob 610. In addition, the slider knob 610 may be configured to be held in a plurality of detents to allow the slider knob to hold in different positions so that the intensity and/or color of the light source may be adjusted by preset amounts.

Feedback may be provided on the user interface 600 to indicate the type of control being adjusted and/or amount of control being applied. The position of the slider knob 610 along the length of the slider slot 612 may represent the intensity of the lighting load. In addition, the user interface 600 may comprise a visual indicator 616 that may be illuminated (e.g., by one or more LEDs) to different colors and/or intensity to inform the user about the color, intensity, or state (e.g., on or off) of the light source. The visual indicator 616 may comprise a light pipe (e.g., a translucent light pipe) that may be connected to the toggle actuator 614 (e.g., as shown in FIGS. 6A and 6B) and may be illuminated, e.g., by the LEDs. Visual feedback may also be provided in other areas of the user interface 600 (e.g., on the bezel 604 or the faceplate 606) to indicate the intensity and/or color of the light source.

Figure 7B:
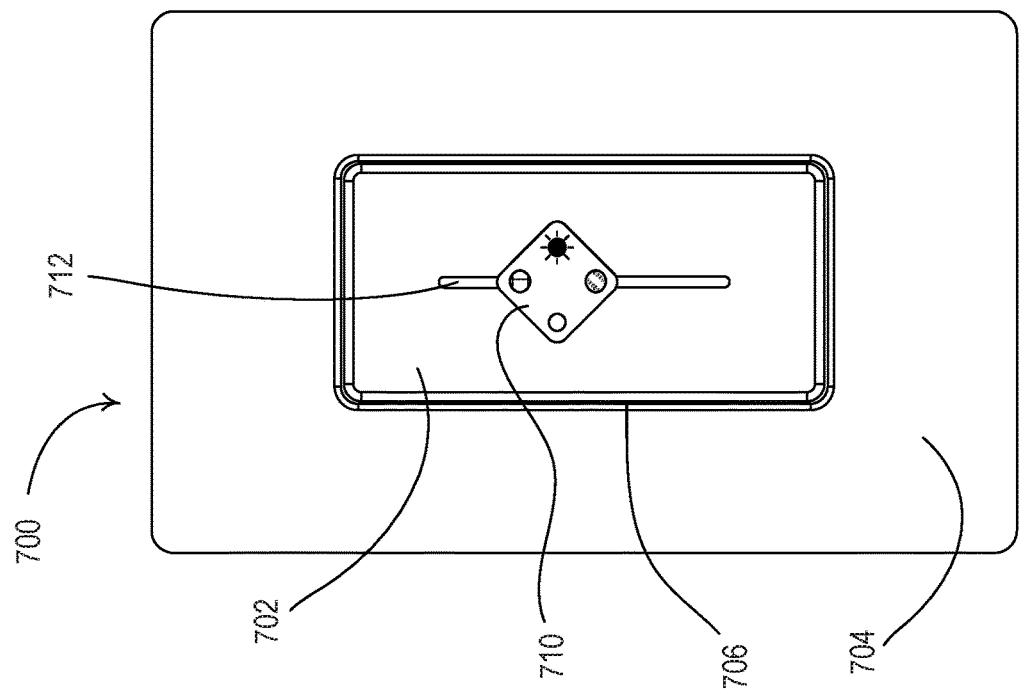
FIGS. 7A and 7B are front views of another example user interface comprising a rotating slider knob for adjusting the intensity and color of a lighting load.
Figure 7A:
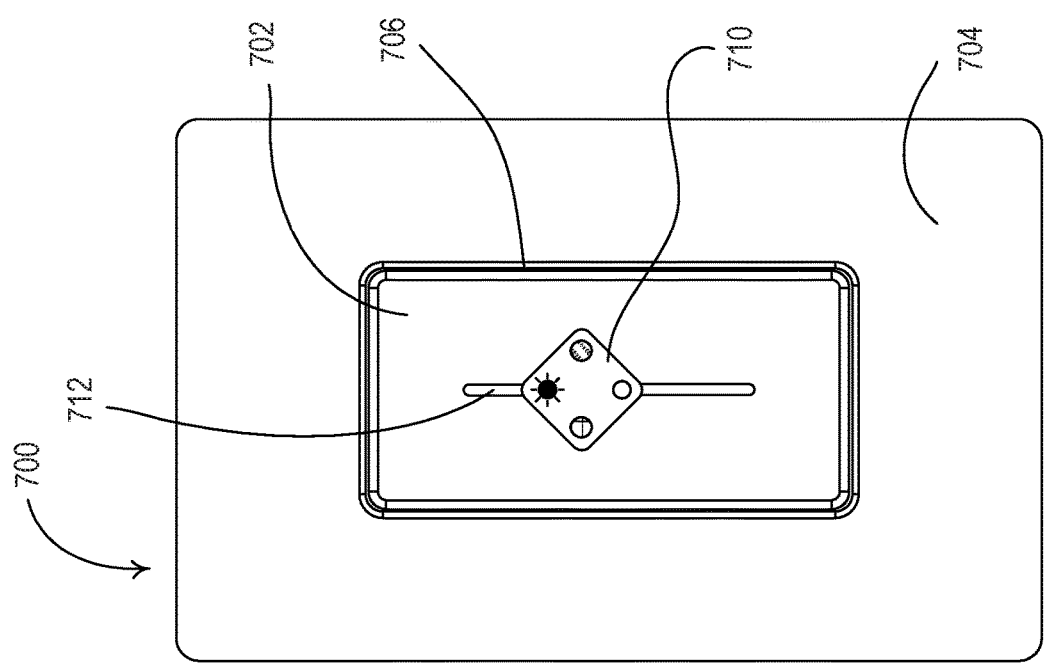

FIGS. 7A and 7B are front views of another example user interface 700 comprising a slider knob 710 (e.g., a rotating slider knob) for controlling the intensity and/or color of a light source. The slider knob 710 may be provided on a bezel 702 that may extend through an opening 706 of a faceplate 704. The slider knob 710 may slide along a slider slot 712. The slider knob 710 may be connected to an internal potentiometer (not shown) via a shaft (not shown) that may extend through the slider slot 712. The slider knob 710 may be configured to rotate about the shaft that extends through the slider slot 712 (e.g., rotate with respect to the bezel 702).

Rotating the slider knob 710 into different angular positions (e.g., different orientations) may set a control mode of the user interface 700 (e.g., between an intensity control mode and a color control mode). Sliding the slider knob 710 along the slider slot 712 may adjust (e.g., set a specific value for) the intensity or color of the light source depending upon the angular position of the slider knob 710. Indicia (e.g., text and/or icons) may be provided on the slider knob 710 to help a user orient the slider knob 710 to select the control mode. For example, to put the user interface 700 into the intensity control mode, the user may turn the slider knob 710 into a position at which a sunburst icon and a circle icon on the slider knob 710 are aligned vertically (e.g., a first angular position). To put the user interface 700 into the color control mode, the user may turn the slider knob 710 into a position at which two hatched icons (e.g., representing different colors) on the slider knob 710 are aligned vertically (e.g., a second angular position). The slider knob 710 may be configured to be held in the first and second angular positions by one or more detents. The user interface 700 may be configured to remain in the previous mode until the slider knob 710 is fully rotated into one of the first or second angular positions. Depending upon the angular position of the slider knob 710 and thus the selected control mode, the position of the slider knob 710 along the length of the slider slot 712 may indicate the intensity or color to which the light source is being controlled.

Visual feedback may be provided on the bezel 702 or the faceplate 704 to inform a user about the intensity and/or color of the light source. Additionally or alternatively, the surface of the slider knob 710 or the slider slot 712 may be illuminated (e.g., by one or more LEDs) to provide the feedback. The user interface 700 may further comprise a visual indicator (not shown) for providing the feedback (e.g., such as the visual indicator 616 of the user interface 600 shown in FIGS. 6A and 6B). In addition, the position of the slider knob 710 along the length of the slider slot 712 may provide an indication of the intensity or color of the light source depending upon the selected control mode.

When the slider knob 710 is rotated to change between the control modes, the intensity or color of the light source may not be immediately controlled to the intensity or color indicated by the position of the slider knob 710 along the length of the slider slot 712 in the newly selected mode. For example, after a rotation of the slider knob 710, the user interface 700 may operate in a "demo" mode during which the light source may not be controlled according to the position of the slider knob 710 along the length of the slide slot 712. In the demo mode, visual feedback may be provided on the user interface of the presently-selected intensity or color. For example, if the slider knob 710 is rotated to change from the intensity control mode to the color control mode, a portion of the user interface may be illuminated to provide feedback of a presently selected color when in the color control mode. In addition, movements of the slider knob 710 along the slider slot 712 may not adjust the intensity or color of the controlled light source in the demo mode (e.g., the present intensity and/or color of the light source may be maintained). During the demo mode, movements of the slider knob 710 may cause the visual feedback provided on the user interface 700 to be adjusted while the intensity or color of the light source may remain constant.

To adjust the intensity or color of the light source after the slider knob 710 is rotated to change between control modes, the slider 710 may be pushed in towards the bezel 702 (e.g., momentarily actuated) to change the user interface to an "active-control" mode. In the active-control mode, sliding the slider knob 710 along the slider slot 712 may adjust the intensity or color of the light source depending upon the angular position of the slider knob 710.

Sliding the slider knob 710 all the way to the bottom of the slider slot 708 may turn off the light source. Pushing the slider knob 710 in towards the bezel 702 may toggle the light source on and off. The user interface 700 may further comprise a toggle actuator (not shown) for toggling the light source on and off (e.g., such as the toggle actuator 614 of the user interface 600 shown in FIGS. 6A and 6B).

Figure 8B:
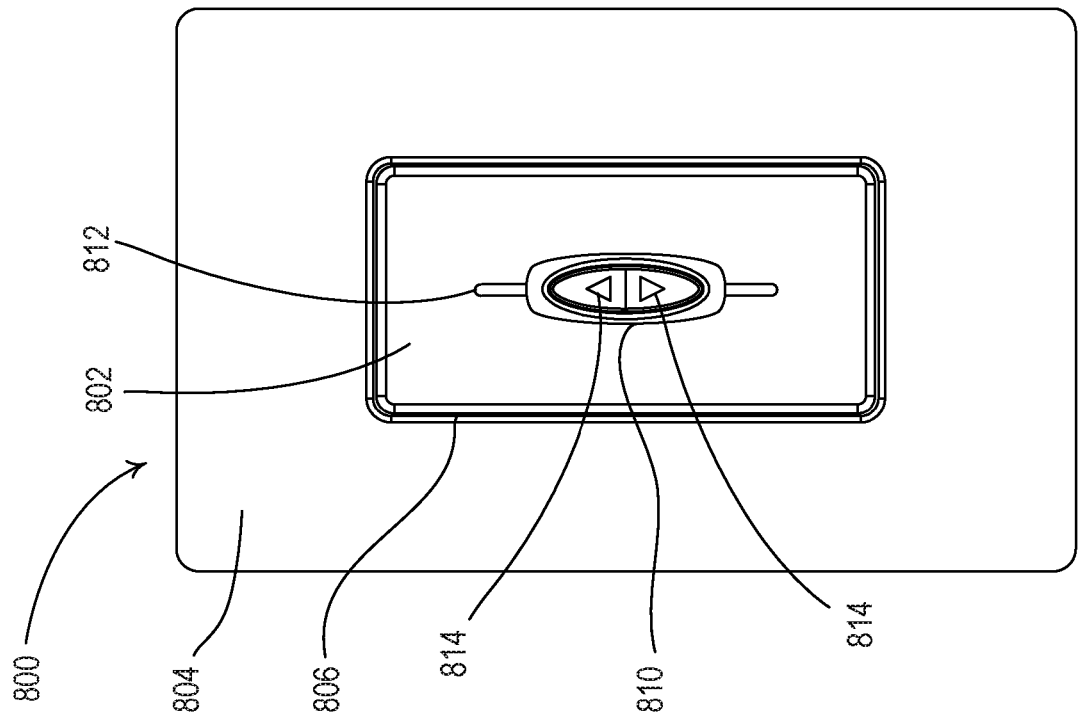
FIGS. 8A and 8B are front views of another example user interface comprising a slider knob and two actuators located on the slider knob for adjusting the intensity and color of a lighting load.
Figure 8A:
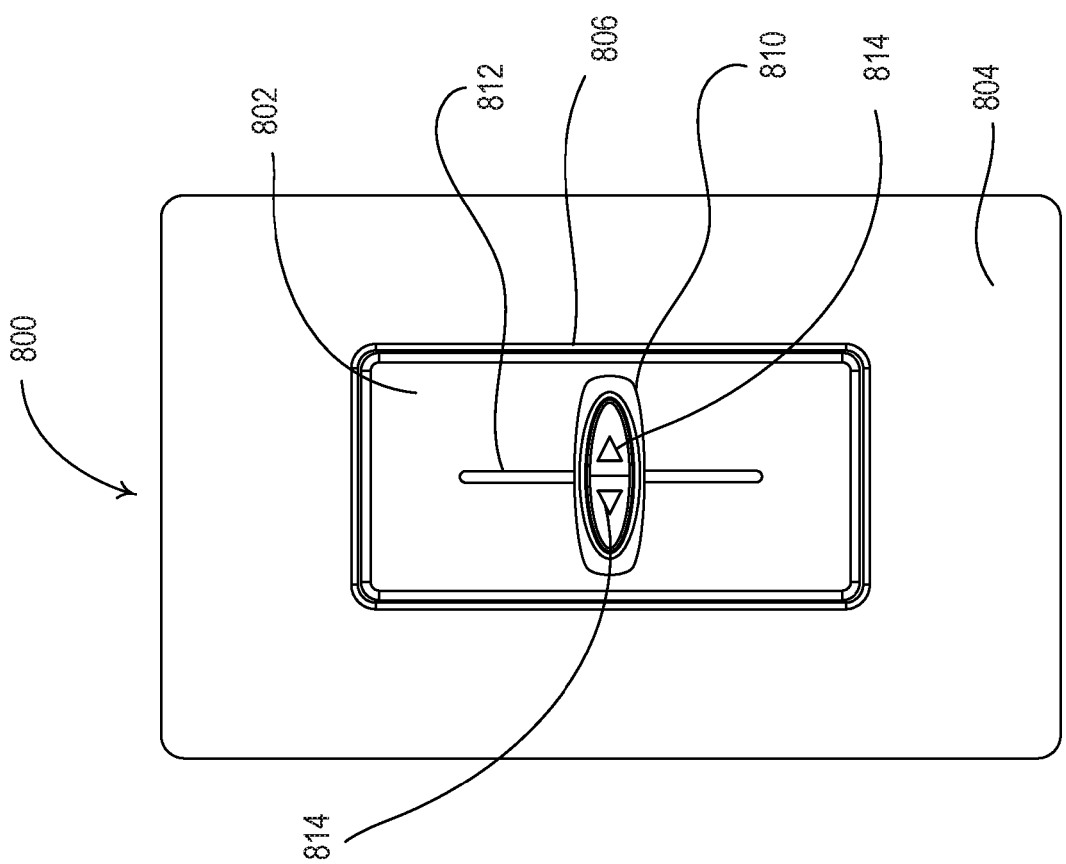

FIGS. 8A and 8B are front views of another example user interface 800 comprising a slider knob 810 and one or more actuators (e.g., such as one or more buttons 814) located on the slider knob. The slider knob 810 may slide along a slider slot 812 that may be provided on a bezel 802 and be accessible through an opening 806 in a faceplate 804. The slider knob 810 may be connected to an internal potentiometer (not shown) via a shaft (not shown) that may extend through the slider slot 812. The slider knob 810 may be configured to rotate about the shaft that extends through the slider slot 812. When the slider knob 810 is rotated to a first angular position (e.g., a horizontal orientation as shown in FIG. 8A), sliding the slider knob 810 along the slider slot 812 (e.g., raising and lowering the slider knob 810) may adjust the intensity of the connected light source, while pressing the buttons 814 may adjust the color (e.g., the color temperature) of the light source. When the slider knob 810 is rotated to a second angular position (e.g., a vertical orientation as shown in FIG. 8B), sliding the slider knob 810 along the slider slot 812 (e.g., raising and lowering the slider knob 810) may apply "dim-to-warm" control over a light source. While the user interface 800 is in the "dim-to-warm" control mode, both the intensity and color (e.g., color temperature) of the light source may be controlled by the movement of the slider knob 810 along the slider slot 812 according to a "dim-to-warm" dimming curve. While in the "dim-to-warm" control mode, the one or more buttons 814 may be temporarily disabled from controlling the color or intensity of the light source. The slider knob 810 may be configured to be held in the first and second angular positions by one or more detents.

Visual feedback/indication may be provided on the bezel 802 or the faceplate 804 to inform a user about the intensity and/or color of the light source. Additionally or alternatively, the surface of the slider knob 810 or the slider slot 812 may be illuminated (e.g., by one or more LEDs) to provide the feedback. The user interface 800 may further comprise a visual indicator (not shown) for providing the feedback (e.g., such as the visual indicator 616 of the user interface 600 shown in FIGS. 6A and 6B).

Figure 9:
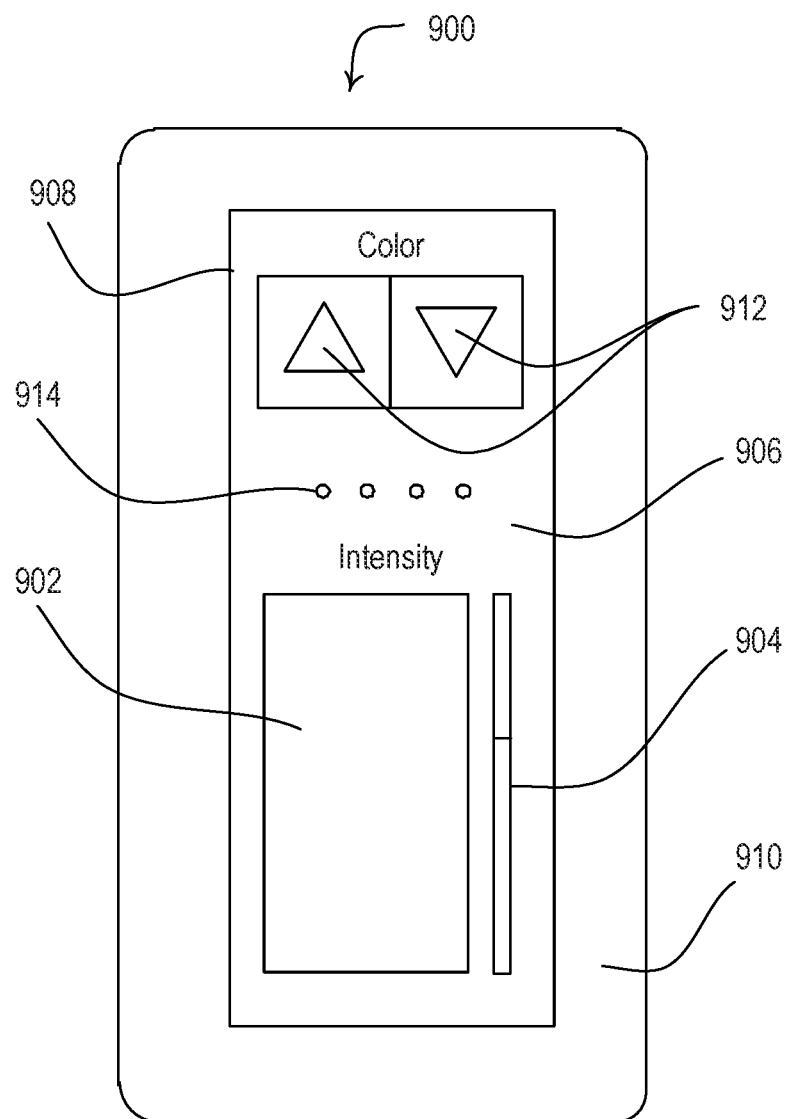
FIG. 9 shows a front view of an example user interface comprising two sets of controls for adjusting the intensity and color of a lighting load.

FIG. 9 shows a front view of another example user interface 900 in which two sets of controls may be used to adjust the intensity and color of a connected light source separately. A first set of controls may include a toggle actuator 902 and an intensity adjustment actuator 904 (e.g., a slide dimmer). Either or both of the toggle actuator 902 and intensity adjustment actuator 904 may be provided on a bezel 906, and may extend through an opening 908 in a faceplate 910. Pressing the toggle actuator 902 may turn the connected light source on or off. When the light source is on, the intensity adjustment actuator 904 may be manipulated to set the intensity of the light source to a specific value within a range (e.g., from approximately 1% to approximately 100%). A second set of controls of the user interface 900 may include one or more actuators (e.g., one or more buttons) for adjusting the color of the light source. For example, a set of buttons 912 may be provided on the bezel 906 and be accessible to the users through the opening 908 of the faceplate 910. One of the buttons may be used to increase the color temperature of the light source while another may be used to decrease the color temperature of the light source. Indicia (e.g., such as text or icons) may be affixed to the user interface 900 to indicate the functional purposes of the controls. Feedback about the intensity and/or color of the light source may be provided. For example, the buttons 912 may be illuminated to reflect the color of the light source as those buttons are actuated. Additionally or alternatively, a visual display 914 (e.g., such as the visual indicators 216) may be provided on the user interface 900 to indicate the intensity and/or color of the light source.

Figure 10:
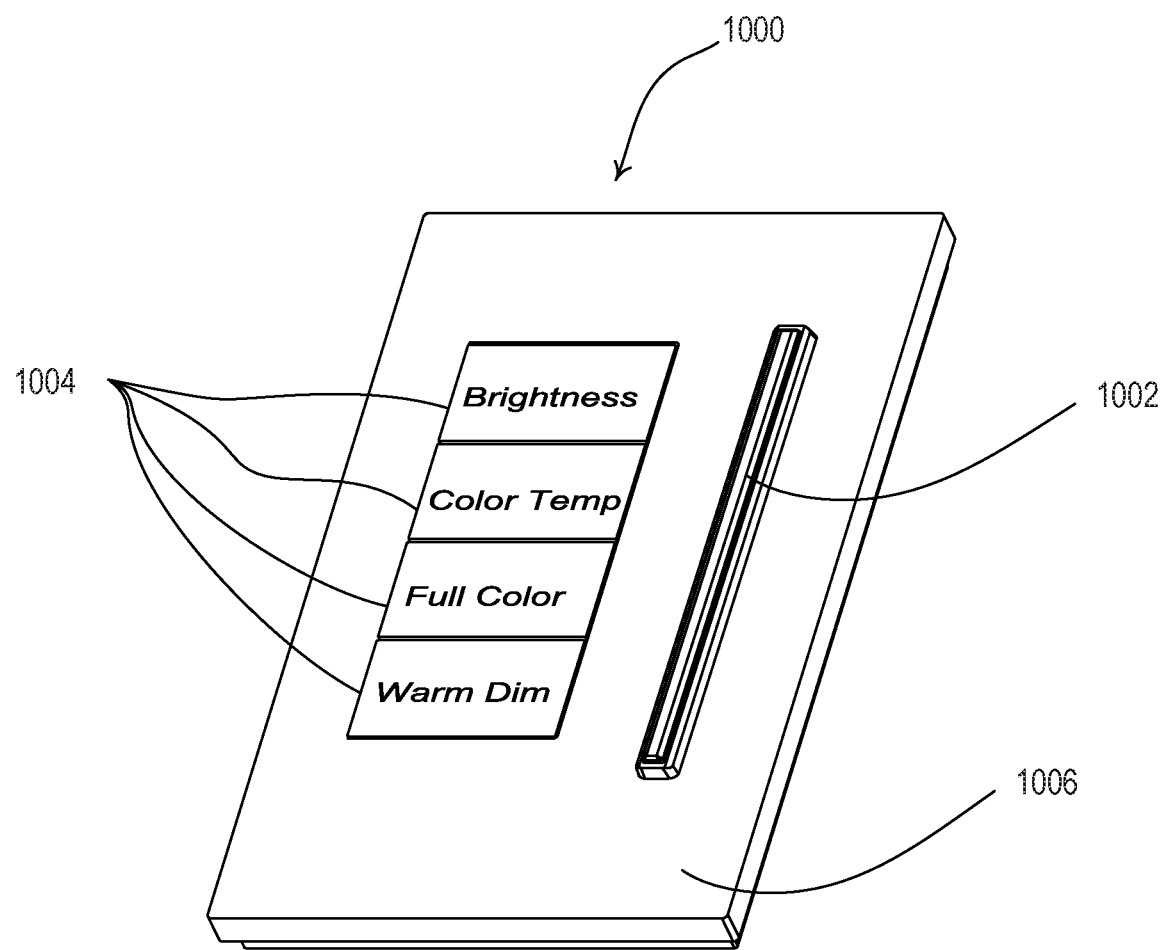
FIG. 10 shows a perspective view of an example user interface comprising an actuator and a control mode selector.

As described herein, the intensity and color of a light source may be set via a common actuator, which may be configured to operate in an intensity control mode or a color control mode. The color control mode may further comprise a color temperature control mode and a red-green-blue RGB color control mode (e.g., a full color control mode). The control mode of the actuator may be set prior to using the actuator to select a particular intensity level or color for the light source. FIG. 10 shows a perspective view of an example user interface 100 that includes an actuator 1002 and a control mode selector 1004. The actuator 1002 and control mode selector 1004 may be provided on a bezel (not shown) and be aligned with respective openings in a faceplate 1006. The actuator 1002 may include a touch sensitive element (e.g., such as a resistive or capacitive touch element), which may be used to set a value towards which the intensity level or color of the light source may be controlled. The control mode selector 1004 may include one or more buttons for placing the actuator 1002 into various control modes. The buttons may be "hard" buttons (e.g., physical buttons) or "soft" buttons (e.g., touch sensitive elements that may emulate the functionality of physical buttons). Indicia (e.g., text or icons) may be affixed to the buttons to indicate the respective control modes associated with the buttons. For instance, "Brightness" may indicate that the corresponding button may be used to activate intensity control, "Control Temp" may indicate that the corresponding button may be used to activate color temperature control, "Full Color" may indicate that the corresponding button may be used to activate the RGB color control mode (e.g., selection of colors along a predetermined trajectory of colors using the actuator 1002), and "Warm Dim" may indicate that the corresponding button may be used to activate dim-to-warm control (e.g., both the intensity and color of the light source may be controlled via the actuator 1002). The default control mode of the actuator 1002 may be set to "Brightness" or intensity control. As such, the user may manipulate the actuator 1002 to adjust the intensity of the light source without having to press the "Brightness" button first. For example, the user may press the actuator 1002 to turn the light source on (e.g., to an intensity level associated with the position of the user's press). The user may manipulate the actuator 1002 to turn the light source off (e.g., by swiping a finger down the surface of the actuator 1002).

Figure 11:
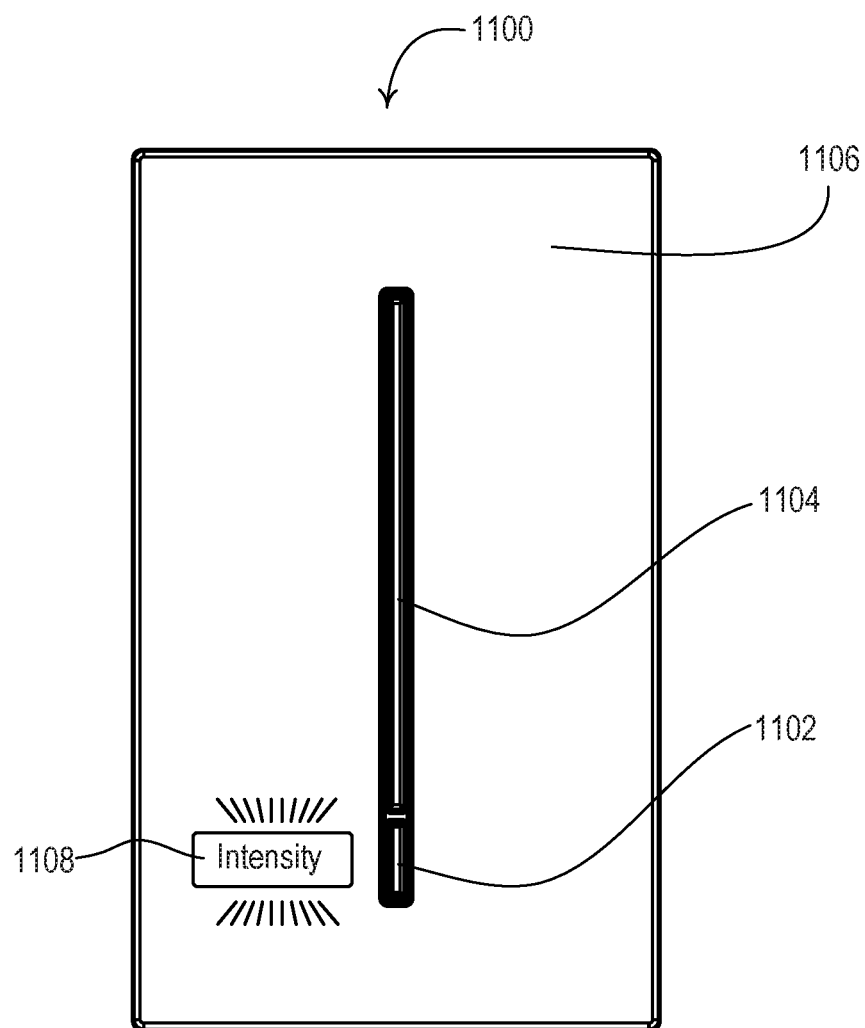
FIG. 11 shows a front view of an example user interface that utilizes a toggle button to set the control mode of an actuator for controlling the intensity and color of a lighting load

FIG. 11 shows a front view of an example user interface 1100 that includes a mode-selection button 1102 for setting the control mode of an actuator 1104. The mode-selection button 1102 may be a "hard" button (e.g., a physical button) or a "soft" button (e.g., a touch sensitive element emulating the functionality of a physical button). A user may actuate the mode-selection button 1102 (e.g., via a quick tap or click) to switch the control mode of the actuator 1104 among several options including, for example, "intensity" control, "color" control, and "dim-to-warm" control (e.g., both the intensity and color of the light source may be controlled via the actuator 1104) of a light source. The user may also use the mode-selection button 1102 to turn the light source on and off. For example, the user may press and hold the mode-selection button 1102 for a brief period of time (e.g., as opposed to a quick tap or click of the button) to turn off the light source. From an "off" state, the light source may be turned back on (e.g., to previously set intensity and/or color) when the user presses the mode-selection button 1102 again. Upon entering the "on" state, the actuator 1104 may enter the "intensity" control mode by default. An area 1108 next to the mode-selection button 1102 may be illuminated to (e.g., in response to the button being pressed) to indicate the control mode of the actuator 1104 (e.g., "intensity," "color," or "warm dim" control), or the on/off state (e.g., "ON" or "OFF") of the light source. Once a control mode has been selected, the actuator 1104 may be manipulated to select a specific value towards which the intensity level and/or color of the light source may be adjusted. The actuator 1104 may include a touch sensitive element (e.g., such as a capacitive touch element). As described herein, a user may swipe a finger across the surface of the touch sensitive element to set a target intensity and/or color for the light source. Visual feedback/indication (e.g., such as the LED light bar described herein) may be provided (e.g., on the actuator 1104) to indicate the intensity and/or color of the light source.

Figure 12:
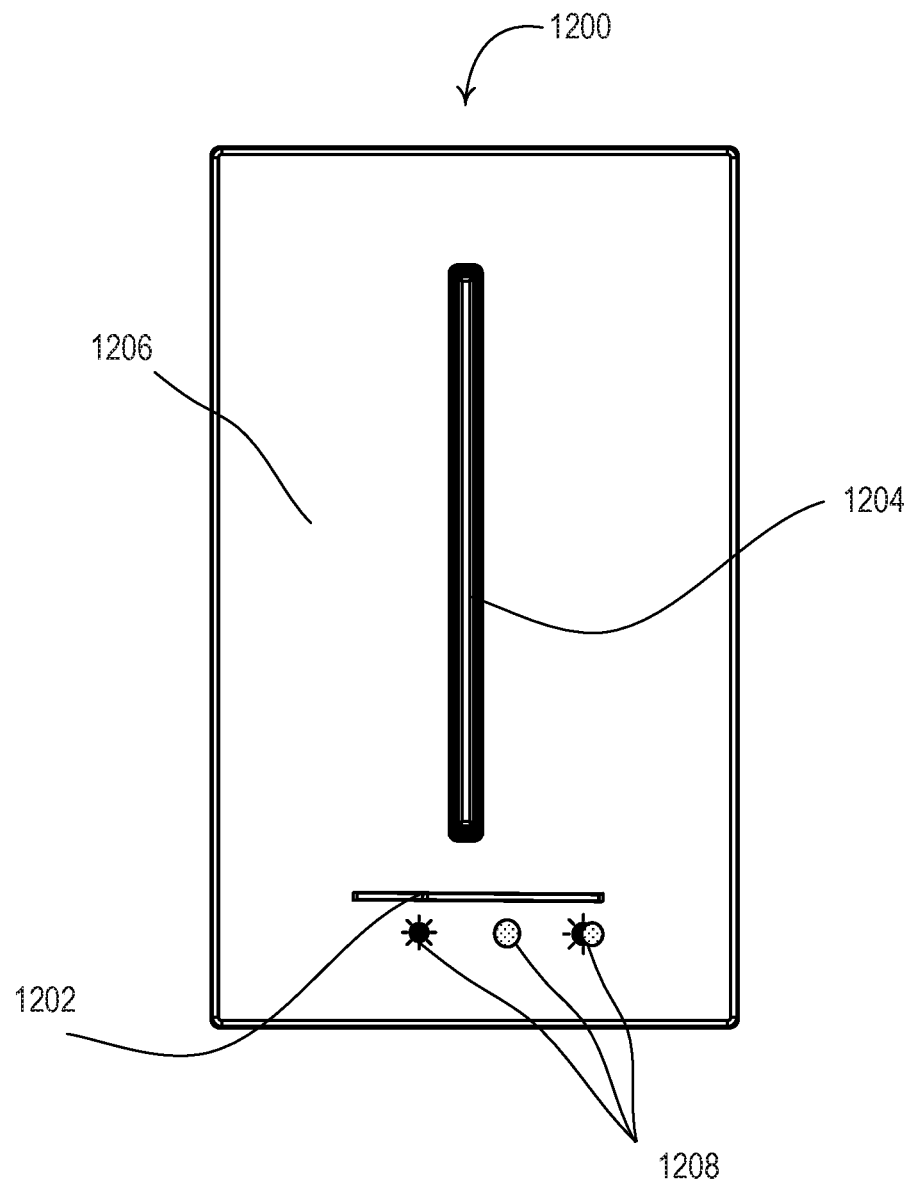
FIG. 12 shows a front view of an example user interface that utilizes a slider to set the control mode of an actuator for controlling the intensity and color of a lighting load.

FIG. 12 shows a front view of an example user interface 1200 that utilizes a mode-selection slider 1202 to set the control mode of an actuator 1204. The mode-selection slider 1202 (e.g., a horizontal slider) may be accessible through an opening in a faceplate 1206. The mode-selection slider 1202 may be used to select a control mode for the actuator 1204 from a plurality of options including, for example, "Intensity Control," "Color Control," and "Warm Dim Control" (e.g., both the intensity and color of the light source may be controlled via the actuator 1204). Indicia 1208 (e.g., text or icons) may be provided in the vicinity of the mode-selection slider 1202 to indicate the available options. The actuator 1204 may comprise a slide actuator or a touch sensitive element (e.g., such as a resistive or capacitive touch element). The actuator 1204 may be manipulated to set a specific value towards which the intensity and/or color of the light source may be adjusted (e.g., as described herein). Visual feedback/indication (e.g., such as the visual indicators 216) may be provided (e.g., on the actuator 1204 or in another area of the faceplate 1206) to indicate the intensity and/or color of the light source.

Figure 13:
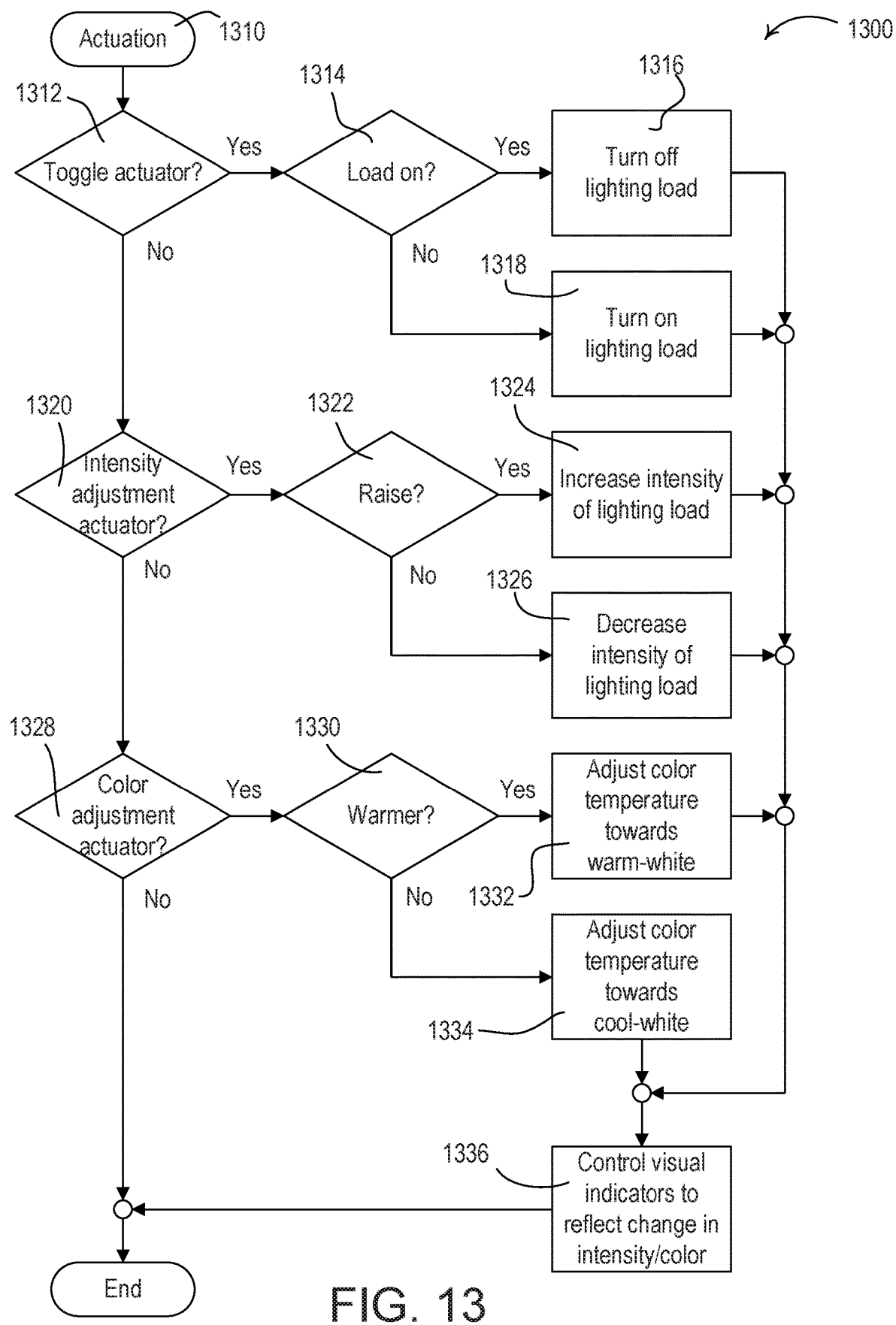
FIGS. 13-16B are flowcharts of example control procedures that may be executed by a control circuit of a control device to control a lighting load in response to inputs received via a user interface.

FIG. 13 is a flowchart of an example control procedure 1300 that may be executed by a control circuit of a control device (e.g., the control circuit 135 of the control module 130) to control a lighting load in response to inputs received via a user interface (e.g., the user interface 200 shown in FIG. 2 and/or the user interface 300 shown in FIG. 3). For example, the control circuit may be configured to adjust the intensity of the lighting load between a minimum intensity level and a maximum intensity level, and adjust the color temperature of the lighting load between a warm-white color temperature and a cool-white color temperature. The control circuit may execute the control procedure 1300 in response to an actuation of an actuator of the user interface at 1310. If a toggle actuator (e.g., the toggle actuator 210) is being actuated at 1312 and the lighting load is presently on at 1314, the control circuit may turn off the lighting load at 1316 (e.g., by rendering the controllably conductive device 134 non-conductive). If the toggle actuator is being actuated at 1312 and the lighting load is presently off at 1314, the control circuit may turn on the lighting load at 1318. If an intensity adjustment actuator (e.g., the intensity adjustment actuator 212) is being actuated at 1320 and the actuation indicates a raise command at 1322 (e.g., the upper portion of the intensity adjustment actuator 212 is being actuated), the control circuit may increase the intensity of the lighting load at 1324. If the intensity adjustment actuator is being actuated at 1320 and the actuation indicates a lower command at 1322 (e.g., the lower portion of the intensity adjustment actuator 212 is being actuated), the control circuit may decrease the intensity of the lighting load at 1326.

If a color adjustment actuator (e.g., the color adjustment actuator 214) is being actuated at 1328 and the actuation indicates a warmer color temperature at 1330 (e.g., the left portion of the color adjustment actuator 214 is being actuated), the control circuit may adjust the color temperature of the lighting load towards the warm-white color temperature at 1332. If the color adjustment actuator is being actuated at 1328 and the actuation indicates a cooler color temperature at 1330 (e.g., the right portion of the color adjustment actuator 214 is being actuated), the control circuit may adjust the color temperature of the lighting load towards the cool-white color temperature at 1334. After the lighting load has been controlled, the control circuit may control the visual indicators to reflect the change sin the intensity and/or color temperature of the lighting load at 1336, before the control procedure exits.

Figure 14:
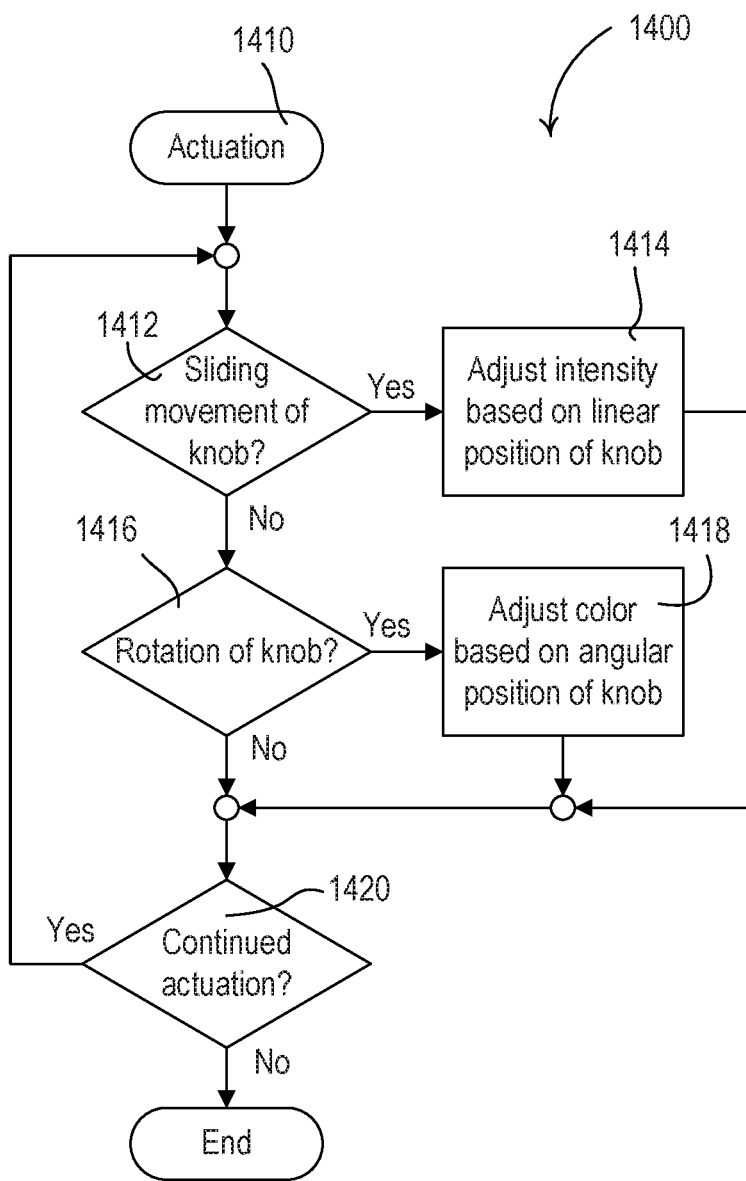

FIG. 14 is a flowchart of an example control procedure 1400 that may be executed by a control circuit of a control device (e.g., the control circuit 135 of the control module 130) to control a lighting load in response to inputs received via a user interface (e.g., the user interface 600 shown in FIGS. 6A and 6B). For example, the user interface may comprise a slider knob (e.g., the slider knob 610) that may be slid through a slider slot (e.g., the slider slot 612) and may be rotated. The control circuit may execute the control procedure 1400 in response to actuation of the slider knob at 1410. If the actuation is a sliding movement of the slider knob through the slider slot at 1412, the control circuit may adjust the intensity of the lighting load based on the position of the slider knob along the length of the slider slot at 1414. If the actuation is rotation of the slider knob at 1416, the control circuit may adjust the color (e.g., color temperature) of the lighting load based on the angular position of the slider knob at 1418. If the actuation is a continued actuation at 1420, the control circuit may continue to adjust the intensity and/or color temperature of the lighting load at 1414 and 1418, respectively. If the actuation is complete at 1420, the control procedure 1400 may end.

Figure 15:
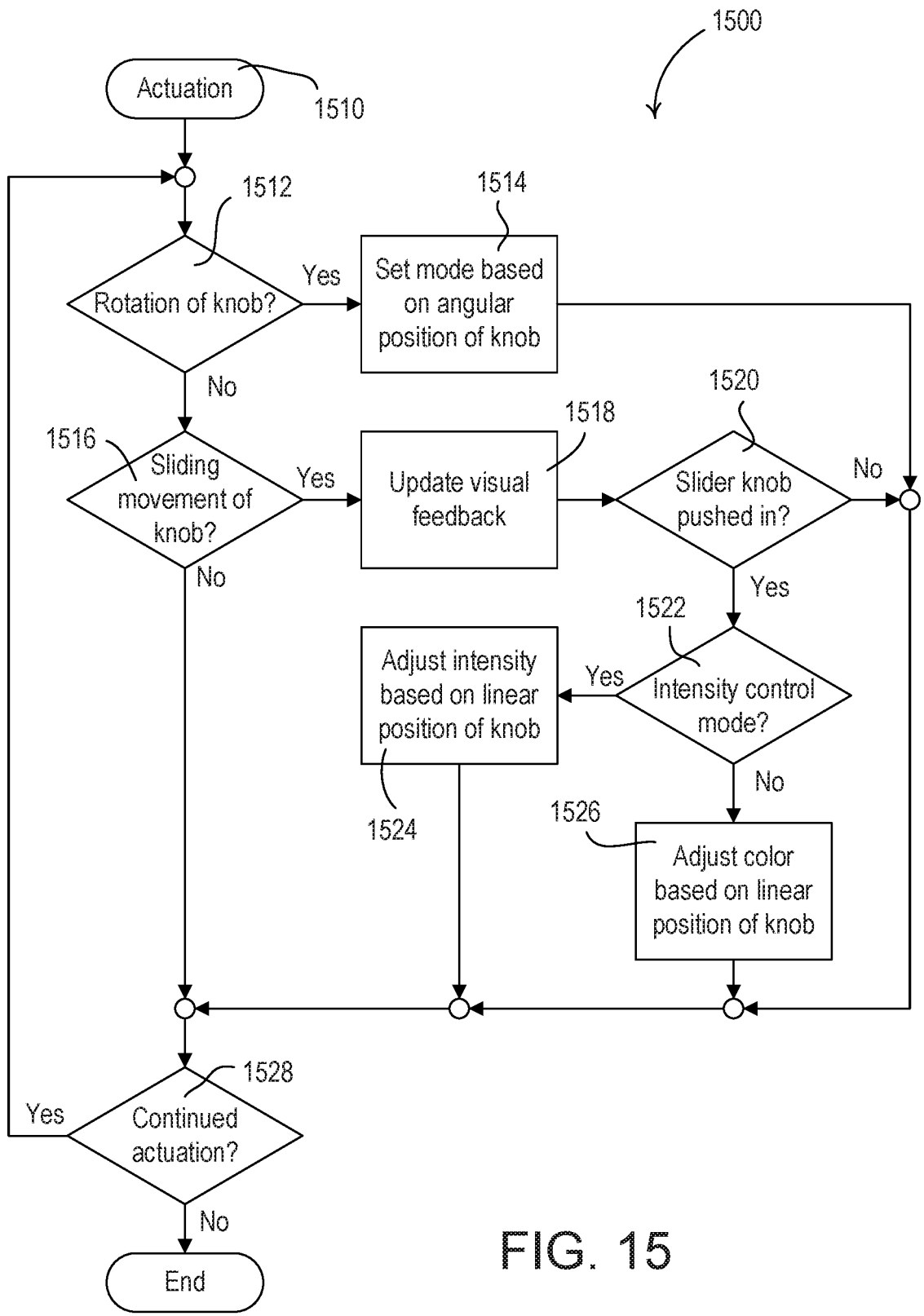

FIG. 15 is a flowchart of an example control procedure 1500 that may be executed by a control circuit of a control device (e.g., the control circuit 135 of the control module 130) to control a lighting load in response to inputs received via a user interface (e.g., the user interface 700 shown in FIGS. 7A and 7B). For example, the user interface may comprise a slider knob (e.g., the slider knob 710) that may be slid through a slider slot (e.g., the slider slot 712) and may be rotated. The control circuit may execute the control procedure 1500 in response to actuation of the slider knob at 1510. If the actuation is rotation of the slider knob at 1512, the control circuit may adjust a control mode at 1514, for example, between an intensity control mode and a color control mode based on the angular position of the slider knob. If the actuation is sliding movement of the slider knob through the slider slot at 1516, the control circuit may update visual feedback provided by the user interface at 1518, for example, to provide visual feedback of the intensity and/or color temperature of the lighting load based on the position of the slider knob along the length of the slider slot. If the slider knob has been pushed in (e.g., momentarily actuated) at least once since the control mode was last changed at 1520 and the intensity control mode is selected at 1522 (e.g., the slider knob is rotated as shown in FIG. 7A), the control circuit may adjust the intensity of the lighting load based on the position of the slider knob along the length of the slider slot at 1524. If the slider knob has been pushed in at least once since the control mode was last changed at 1520 and the color control mode is selected at 1522 (e.g., the slider knob is rotated as shown in FIG. 7B and the intensity control mode is not selected), the control circuit may adjust the color temperature of the lighting load based on the position of the slider knob along the length of the slider slot at 1526. If the slider knob has not been pushed in at least once since the control mode was last changed at 1520, the control circuit may not adjust the intensity and/or color temperature of the lighting load based on the position of the slider knob along the length of the slider slot (e.g., may operate in a demo mode in which the present intensity and/or color temperature of the lighting load may be maintained). If the actuation is a continued actuation at 1528, the control procedure 1500 may loop around to process the actuation of the slider knob again. If the actuation is complete at 1528, the control procedure 1500 may end.

Figure 16A:
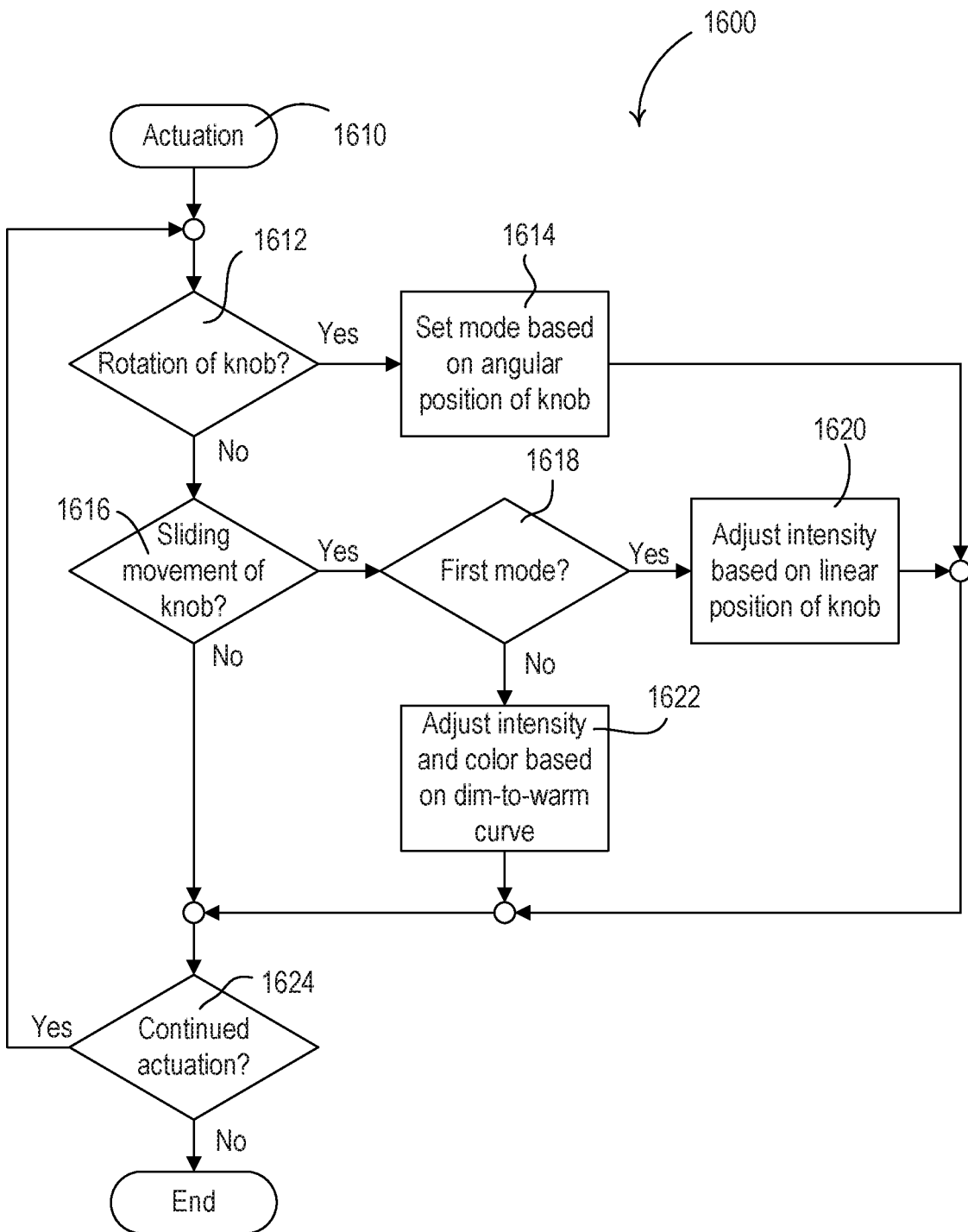
Figure 16B:
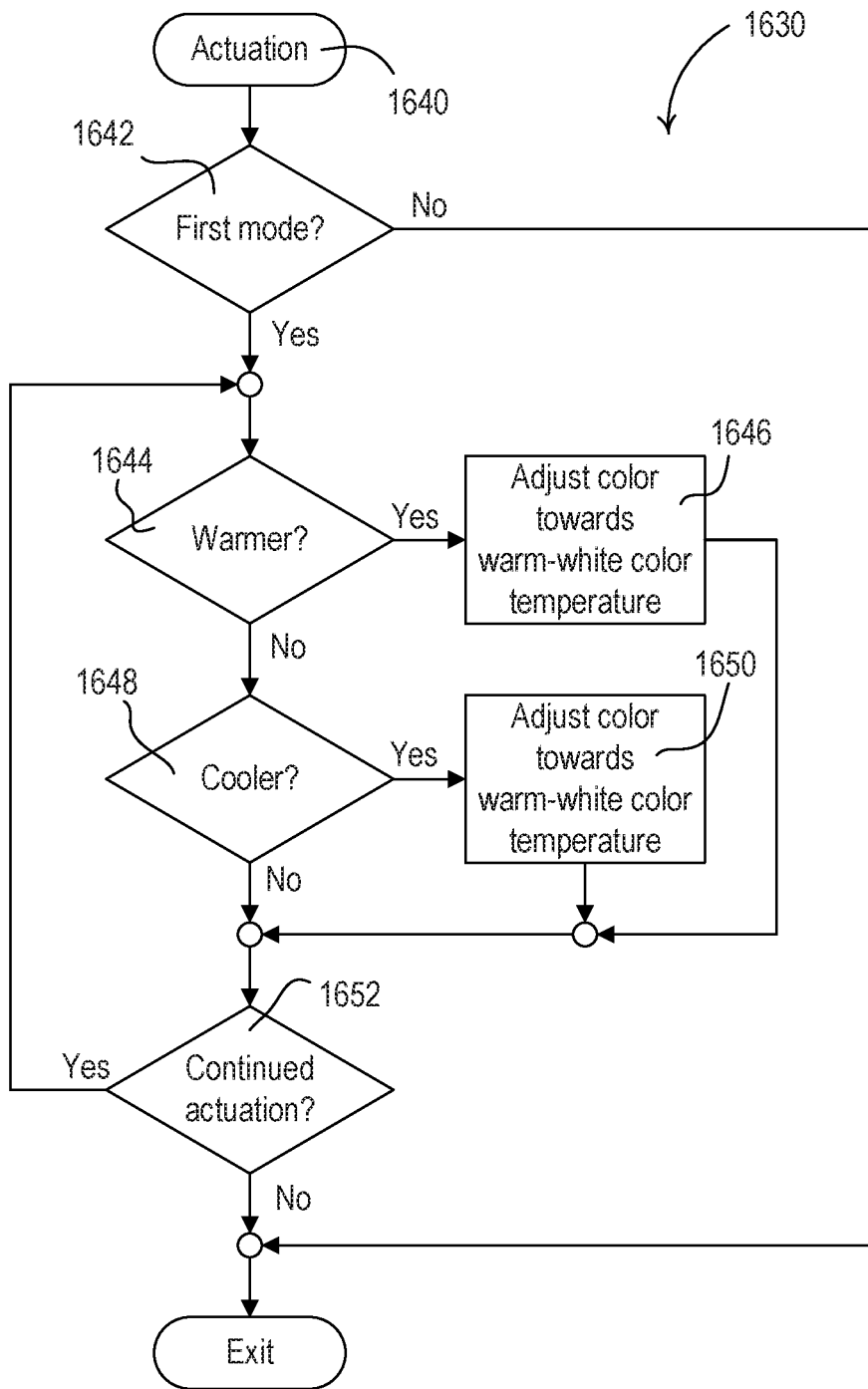

FIGS. 16A and 16B are flowcharts of example control procedures 1600, 1630 that may be executed by a control circuit of a control device (e.g., the control circuit 135 of the control module 130) to control a lighting load in response to inputs received via a user interface (e.g., the user interface 800 shown in FIGS. 8A and 8B). For example, the user interface may comprise a slider knob (e.g., the slider knob 810) that may be slid through a slider slot (e.g., the slider slot 812) and may be rotated, and one or more buttons (e.g., buttons 814). The control circuit may be configured to adjust the intensity of the lighting load between a minimum intensity level and a maximum intensity level, and adjust the color temperature of the lighting load between a warm-white color temperature and a cool-white color temperature.

As shown in FIG. 16A, the control circuit may execute the first control procedure 1600 in response to actuation of the slider knob at 1610. If the actuation is rotation of the slider knob at 1612, the control circuit may adjust a control mode at 1614, for example, between first and second modes based on the angular position of the slider knob. If the actuation is sliding movement of the slider knob through the slider slot at 1616 and the first mode is selected at 1618 (e.g., the slider knob is rotated as shown in FIG. 8A), the control circuit may adjust the intensity of the lighting load based on the position of the slider knob along the length of the slider slot at 1620. If the actuation is sliding movement of the slider knob through the slider slot at 1616 and the second mode is selected at 1618 (e.g., the slider knob is rotated as shown in FIG. 8B), the control circuit may adjust both the intensity and the color temperature of the lighting load based on a dim-to-warm dimming curve and the position of the slider knob along the length of the slider slot at 1622. If the actuation is a continued actuation at 1624, the first control procedure 1600 may loop around to process the actuation of the slider knob again. If the actuation is complete at 1624, the first control procedure 1600 may end.

Turning to FIG. 16B, the control circuit may execute the second control procedure 1630 in response to an actuation of one of the buttons at 1640. If the first mode is selected at 1642 and one of buttons was actuated to adjust the color temperature to be warmer (e.g., a "warm-white" button or a "warmer" button was actuated) at 1644, the control circuit may adjust the color temperature of the lighting load towards the warm-white color temperature at 1646. If one of buttons was actuated to adjust the color temperature to be cooler (e.g., a "cool-white" button or a "cooler" button was actuated) at 1648, the control circuit may adjust the color temperature of the lighting load towards the cool-white color temperature at 1650. If the actuation is a continued actuation at 1652, the control circuit adjust the color temperature again at 1646 and 1650. If the actuation is complete at 1652, the second control procedure 1630 may end. If the first mode is not selected at 1642, the second control procedure 1630 may end without adjusting the color temperature of the lighting load.

Although the examples provided herein are described with reference to one or more light sources, the examples may be applied to other electrical loads. For example, one or more of the embodiments described herein may be used to control a variety of electrical load types, such as, for example, a motorized window treatment or a projection screen, a motorized interior or exterior shutters, a heating, ventilation, and air conditioning (HVAC) system, an air conditioner, a compressor, a humidity control unit, a dehumidifier, a water heater, a pool pump, a refrigerator, a freezer, a television or computer monitor, a power supply, an audio system or amplifier, a generator, an electric charger, such as an electric vehicle charger, and an alternative energy controller (e.g., a solar, wind, or thermal energy controller). A single control circuit may be coupled to and/or adapted to control multiple types of electrical loads in a load control system.

The invention claimed is:

1. A control device for controlling a lighting load in a load control system, the control device comprising:
   a bezel comprising a slider slot;
   a slider knob configured to slide along the slider slot, the slider knob further configured to be rotated with respect to the bezel into a first angular position and a second angular position; and
   a control circuit configured to generate a first control signal for controlling the intensity of the lighting load in response to a movement of the slider knob along the slider slot when the slider knob is in the first angular position, and to generate a second control signal for controlling a color of the lighting load in response to a movement of the slider knob along the slider slot when the slider knob is in the second angular position.

2. The control device of claim 1, further comprising:
   a button configured to receive a user input for adjusting a color temperature of the lighting load.

3. The control device of claim 2, wherein the control circuit is configured to adjust the color temperature of the lighting load in response to actuations of the button when the slider knob is in the first angular position.

4. The control device of claim 3, wherein the control circuit is configured to adjust both the intensity and the color temperature of the lighting load in response to the movement of the slider knob along the slider slot when the slider knob is in the second angular position.

5. The control device of claim 4, wherein the control circuit is configured to adjust both the intensity and the color temperature of the lighting load using dim-to-warm control when the slider knob is in the second angular position.

6. The control device of claim 3, wherein the control circuit is not configured to adjust the color temperature of the lighting load in response to actuations of the button when the slider knob is in the second angular position.

7. The control device of claim 2, wherein the button is provided on the slider knob.

8. The control device of claim 7, wherein the button is a first button, the control device further comprising a second button on the slider knob, the control circuit configured to adjust the color temperature of the lighting load towards a warm-white color temperature in response to actuations of the first button, and towards a cool-white color temperature in response to actuations of the second button.

9. The control device of claim 1, further comprising:
   a controllably conductive device adapted to be coupled in series between an alternating-current (AC) power source and the lighting load for controlling power delivered to the lighting load.

10. The control device of claim 9, further comprising:
    a communication circuit configured to transmit messages to the lighting load;
    wherein the control circuit is configured to transmit the second control signal for controlling the color of the lighting load via the communication circuit.

11. The control device of claim 10, wherein the control circuit is configured to control the controllably conductive device to turn the lighting load on and off, and transmit the first control signal for controlling the intensity of the lighting load via the communication circuit.

12. The control device of claim 10, wherein the control circuit is configured to control the controllably conductive device to render the controllably conductive device conductive and non-conductive to control the intensity of the lighting load in response to the first control signal.

13. The control device of claim 10, wherein the communication circuit is configured to transmit the messages to the lighting load using a wireless communication scheme.

14. The control device of claim 10, wherein the communication circuit is configured to transmit the messages to the lighting load via power wiring between the control device and the lighting load.

15. The control device of claim 1, wherein the control circuit is configured to adjust both the intensity and a color temperature of the lighting load in response to the movement of the slider knob along the slider slot when the slider knob is in the second angular position.

16. The control device of claim 15, wherein the control circuit is configured to adjust both the intensity and the color temperature of the lighting load using dim-to-warm control when the slider knob is in the second angular position.

17. The control device of claim 1, wherein the control circuit is configured to adjust only the intensity of the lighting load in response to the movement of the slider knob along the slider slot when the slider knob is in the first angular position.

18. The control device of claim 17, wherein the control circuit is configured to adjust only a color temperature of the lighting load in response to the movement of the slider knob along the slider slot when the slider knob is in the second angular position.

19. The control device of claim 1, wherein, after a rotation of the slider knob from the first angular position to the second angular position, the control circuit is configured to maintain the color of the lighting load constant in response to movements of the slider knob along the slider slot until the slider knob has been pushed in towards the bezel; and
    wherein, after the slider knob has been pushed in towards the bezel, the control circuit is configured to generate the second control signal for controlling the color of the lighting load in response to movements of the slider knob along the slider slot.

20. The control device of claim 1, wherein, after a rotation of the slider knob from the second angular position to the first angular position, the control circuit is configured to maintain the intensity of the lighting load constant in response to movements of the slider knob along the slider slot until the slider knob has been pushed in towards the control device; and
    wherein, after the slider knob has been pushed in towards the control device, the control circuit is configured to generate the first control signal for controlling the intensity of the lighting load in response to movements of the slider knob along the slider slot.

21. The control device of claim 1, wherein the slider knob comprises indicia to indicate the first and second angular positions.

22. The control device of claim 1, wherein the control circuit is configured to transmit the first and second control signals to the lighting load via one or more wired analog control links.

* * * * *